(12) United States Patent
Russell et al.

(10) Patent No.: US 6,675,094 B2
(45) Date of Patent: Jan. 6, 2004

(54) PATH PREDICTION SYSTEM AND METHOD

(75) Inventors: Mark E. Russell, Westford, MA (US);
Michael Joseph Delcheccolo, Westford, MA (US); John M. Firda, Andover, MA (US)

(73) Assignee: Raytheon Company, Lexington, MA (US)

( * ) Notice: Subject to any disclaimer, the term of this patent is extended or adjusted under 35 U.S.C. 154(b) by 155 days.

(21) Appl. No.: 09/949,295

(22) Filed: Sep. 7, 2001

(65) Prior Publication Data

US 2002/0049539 A1 Apr. 25, 2002

Related U.S. Application Data

(60) Provisional application No. 60/231,113, filed on Sep. 8, 2000.

(51) Int. Cl.[7] .................................................. G06G 7/78
(52) U.S. Cl. ..................................................... 701/301
(58) Field of Search .............................. 701/1, 26, 116, 701/119, 121–122, 300–302; 342/454, 455, 458, 461; 340/903, 901

(56) References Cited

U.S. PATENT DOCUMENTS

| | | |
|---|---|---|
| 3,697,985 A | 10/1972 | Faris et al. |
| 3,727,215 A | 4/1973 | Wilmot |
| 3,935,559 A | 1/1976 | Straffon et al. |
| 3,940,696 A | 2/1976 | Nagy |
| 3,974,501 A | 8/1976 | Ritzie |
| 3,978,481 A | 8/1976 | Angwin et al. |
| 4,003,049 A | 1/1977 | Sterzer et al. |
| 4,008,473 A | 2/1977 | Hinachi et al. |
| 4,008,475 A | 2/1977 | Johnson |
| 4,035,797 A | 7/1977 | Nagy |

(List continued on next page.)

FOREIGN PATENT DOCUMENTS

| | | |
|---|---|---|
| DE | 196 32 889 | 2/1998 |
| DE | 195 23 693 | 5/1998 |
| DE | 198 55 400 | 12/1998 |
| DE | 198 50 128 | 5/1999 |
| EP | 0 398 712 | 5/1990 |
| EP | 0 484 995 | 5/1992 |
| EP | 0 642 190 A1 | 12/1993 |
| EP | 0 784 213 | 1/1996 |

(List continued on next page.)

OTHER PUBLICATIONS

International Search Report of PCT Application No. PCT/US01/42065 dated May 14, 2002.
International Search Report of PCT Application No. PCT/US01/25594 dated May 7, 2002.

(List continued on next page.)

Primary Examiner—Thu Nguyen
(74) Attorney, Agent, or Firm—Daly, Crowley & Mofford, LLP.

(57) ABSTRACT

There is disclosed herein a method for detecting objects in a predicted path of a host vehicle moving on a highway lane. The method is for use in a system including a forward looking sensor, preferably a radar system, for providing range, angle and velocity data for objects within a field of view in front of the host vehicle, measuring systems for providing velocity and yaw rate data for the host vehicle, and a processing system responsive to the forward looking sensor and the measuring systems. The method includes the unordered steps of (a) calculating an estimated path of the host vehicle based on its velocity and yaw rate; (b) calculating estimated paths for each of the objects; (c) determining the lateral distance of each object from the predicted path of the host vehicle; and (d) classifying each object as either in or out of the highway lane of the host vehicle. The method includes processes for detecting lane changes by the host vehicle and for generating alternative path hypotheses in response to target deviations from the predicted paths.

20 Claims, 18 Drawing Sheets

U.S. PATENT DOCUMENTS

| | | |
|---|---|---|
| 4,063,243 A | 12/1977 | Anderson et al. |
| 4,079,377 A | 3/1978 | zur Heiden et al. |
| 4,143,370 A | 3/1979 | Yamanaka et al. |
| 4,203,113 A | 5/1980 | Baghdady |
| 4,209,791 A | 6/1980 | Gerst et al. |
| 4,217,582 A | 8/1980 | Endo et al. |
| 4,246,585 A | 1/1981 | Mailloux |
| 4,308,536 A | 12/1981 | Sims, Jr. et al. |
| 4,348,675 A | 9/1982 | Senzaki et al. |
| 4,349,823 A | 9/1982 | Tagami et al. |
| 4,409,899 A | 10/1983 | Owen et al. |
| 4,414,550 A | 11/1983 | Tresselt |
| 4,507,662 A | 3/1985 | Rothenberg et al. |
| 4,543,577 A | 9/1985 | Tachibana et al. |
| 4,549,181 A | 10/1985 | Tachibana et al. |
| 4,622,636 A | 11/1986 | Tachibana |
| 4,673,937 A | 6/1987 | Davis |
| 4,703,429 A | 10/1987 | Sakata |
| 4,718,558 A | 1/1988 | Castaneda |
| 4,901,083 A | 2/1990 | May et al. |
| 4,962,383 A | 10/1990 | Tresselt |
| 4,970,653 A | 11/1990 | Kenue |
| 4,994,809 A | 2/1991 | Yung et al. |
| 5,008,678 A | 4/1991 | Herman |
| 5,014,200 A | 5/1991 | Chundrlik et al. |
| 5,023,617 A | 6/1991 | Deering |
| 5,045,856 A | 9/1991 | Paoletti |
| 5,115,245 A | 5/1992 | Wen et al. |
| 5,134,411 A | 7/1992 | Adler |
| 5,138,321 A | 8/1992 | Hammer |
| 5,173,859 A | 12/1992 | Deering |
| 5,189,426 A | 2/1993 | Asbury et al. |
| 5,235,316 A | 8/1993 | Qualizza |
| 5,249,027 A | 9/1993 | Mathur et al. |
| 5,249,157 A | 9/1993 | Taylor |
| 5,252,981 A | 10/1993 | Grein et al. |
| 5,268,692 A | 12/1993 | Grosch et al. |
| 5,280,288 A | 1/1994 | Sherry et al. |
| 5,285,207 A | 2/1994 | Asbury et al. |
| 5,302,956 A | 4/1994 | Asbury et al. |
| 5,315,303 A | 5/1994 | Tsou et al. |
| 5,325,096 A | 6/1994 | Pakett |
| 5,325,097 A | 6/1994 | Zhang et al. |
| 5,339,075 A | 8/1994 | Abst et al. |
| 5,341,144 A | 8/1994 | Stove |
| 5,343,206 A | 8/1994 | Ansaldi et al. |
| 5,351,044 A | 9/1994 | Mathur et al. |
| RE34,773 E | 11/1994 | Dombrowski |
| 5,390,118 A | 2/1995 | Margolis et al. |
| 5,394,292 A | 2/1995 | Hayashida |
| 5,396,252 A | 3/1995 | Kelly |
| 5,400,864 A | 3/1995 | Winner et al. |
| 5,410,745 A | 4/1995 | Friesen et al. |
| 5,414,643 A | 5/1995 | Blackman et al. |
| 5,451,960 A | 9/1995 | Kastella et al. |
| 5,454,442 A | 10/1995 | Labuhn et al. |
| 5,467,072 A | 11/1995 | Michael |
| 5,467,283 A | 11/1995 | Butsuen et al. |
| 5,471,214 A | 11/1995 | Faibish et al. |
| 5,479,173 A | 12/1995 | Yoshioka et al. |
| 5,481,268 A | 1/1996 | Higgins |
| 5,483,453 A | 1/1996 | Uemura et al. |
| 5,485,155 A | 1/1996 | Hibino |
| 5,485,159 A | 1/1996 | Zhang et al. |
| 5,486,832 A | 1/1996 | Hulderman |
| 5,493,302 A | 2/1996 | Woll et al. |
| 5,495,252 A | 2/1996 | Adler |
| 5,508,706 A | 4/1996 | Tsou et al. |
| 5,517,196 A | 5/1996 | Pakett et al. |
| 5,517,197 A | 5/1996 | Algeo et al. |
| 5,521,579 A | 5/1996 | Bernhard |
| 5,525,995 A | 6/1996 | Benner |
| 5,530,447 A | 6/1996 | Henderson et al. |
| 5,572,428 A * | 11/1996 | Ishida et al. ................ 701/301 |
| 5,583,495 A | 12/1996 | Ben Lu Lu |
| 5,587,908 A | 12/1996 | Kajiwara |
| 5,613,039 A | 3/1997 | Wang et al. |
| 5,619,208 A | 4/1997 | Tamatsu et al. |
| 5,625,362 A | 4/1997 | Richardson |
| 5,627,510 A | 5/1997 | Yuan |
| 5,633,642 A | 5/1997 | Hoss et al. |
| 5,654,715 A | 8/1997 | Hayashikura et al. |
| 5,670,963 A | 9/1997 | Kubota et al. |
| 5,675,345 A | 10/1997 | Pozgay et al. |
| 5,678,650 A | 10/1997 | Ishihara et al. |
| 5,689,264 A | 11/1997 | Ishikawa et al. |
| 5,712,640 A | 1/1998 | Andou et al. |
| 5,715,044 A | 2/1998 | Hayes |
| 5,717,399 A | 2/1998 | Urabe et al. |
| 5,719,580 A | 2/1998 | Core |
| 5,731,778 A | 3/1998 | Nakatani et al. |
| 5,734,344 A | 3/1998 | Yamada |
| 5,757,074 A | 5/1998 | Matloubian et al. |
| 5,757,307 A | 5/1998 | Nakatani et al. |
| 5,767,793 A | 6/1998 | Agravante et al. |
| 5,771,007 A | 6/1998 | Arai et al. |
| 5,777,563 A | 7/1998 | Minissale et al. |
| 5,805,103 A | 9/1998 | Doi et al. |
| 5,808,561 A | 9/1998 | Kinoshita et al. |
| 5,808,728 A | 9/1998 | Uehara |
| 5,818,355 A | 10/1998 | Shirai et al. |
| 5,839,534 A | 11/1998 | Chakraborty et al. |
| 5,905,472 A | 5/1999 | Wolfson et al. |
| 5,923,280 A | 7/1999 | Farmer |
| 5,926,126 A | 7/1999 | Engelman |
| 5,929,802 A | 7/1999 | Russell et al. |
| 5,938,714 A | 8/1999 | Santonaka |
| 5,940,011 A | 8/1999 | Agravante et al. |
| 5,949,366 A | 9/1999 | Herrmann |
| 5,959,570 A | 9/1999 | Russell |
| 5,977,904 A | 11/1999 | Mizuno et al. |
| 5,978,736 A | 11/1999 | Greendale |
| 5,999,092 A | 12/1999 | Smith et al. |
| 5,999,119 A | 12/1999 | Carnes et al. |
| 5,999,874 A | 12/1999 | Winner et al. |
| 6,011,507 A | 1/2000 | Curran et al. |
| 6,018,308 A | 1/2000 | Shirai |
| 6,026,347 A | 2/2000 | Schuster |
| 6,026,353 A | 2/2000 | Winner |
| 6,028,548 A | 2/2000 | Farmer |
| 6,037,860 A | 3/2000 | Zander et al. |
| 6,037,894 A | 3/2000 | Pfizenmaier et al. |
| 6,040,796 A | 3/2000 | Matsugatani et al. |
| 6,043,772 A | 3/2000 | Voigtlaender et al. |
| 6,044,321 A | 3/2000 | Nakamura et al. |
| 6,049,257 A | 4/2000 | Hauk |
| 6,052,080 A | 4/2000 | Magori |
| 6,057,797 A | 5/2000 | Wagner |
| 6,069,581 A | 5/2000 | Bell et al. |
| 6,070,682 A | 6/2000 | Isogai et al. |
| 6,075,492 A | 6/2000 | Schmidt et al. |
| 6,076,622 A | 6/2000 | Chakraborty et al. |
| 6,085,151 A | 7/2000 | Farmer et al. |
| 6,087,975 A | 7/2000 | Sugimoto et al. |
| 6,091,355 A | 7/2000 | Cadotte, Jr. et al. |
| 6,097,331 A | 8/2000 | Matsugatani et al. |
| 6,097,931 A | 8/2000 | Weiss et al. |
| 6,104,336 A | 8/2000 | Curran et al. |
| 6,107,956 A | 8/2000 | Russell et al. |
| 6,114,985 A | 9/2000 | Russell et al. |
| 6,127,965 A | 10/2000 | McDade et al. |

| | | |
|---|---|---|
| 6,130,607 A | 10/2000 | McClanahan et al. |
| 6,147,637 A | 11/2000 | Morikawa et al. |
| 6,147,638 A | 11/2000 | Rohling et al. |
| 6,154,168 A | 11/2000 | Egawa et al. |
| 6,161,073 A | 12/2000 | Tange et al. |
| 6,163,252 A | 12/2000 | Nishiwaki |
| 6,184,819 B1 | 2/2001 | Adomat et al. |
| 6,188,950 B1 | 2/2001 | Tsutsumi et al. |
| 6,198,426 B1 | 3/2001 | Tamatsu et al. |
| 6,198,434 B1 | 3/2001 | Martek et al. |
| 6,202,027 B1 * | 3/2001 | Alland et al. ............... 701/301 |
| 6,215,438 B1 | 4/2001 | Oswald et al. |
| 6,225,918 B1 | 5/2001 | Kam |
| 6,232,910 B1 | 5/2001 | Bell et al. |
| 6,233,516 B1 | 5/2001 | Egawa |
| 6,252,560 B1 | 6/2001 | Tanaka et al. |
| 6,255,984 B1 | 7/2001 | Kreppold et al. |
| 6,256,573 B1 | 7/2001 | Higashimata |
| 6,259,395 B1 | 7/2001 | Adachi et al. |
| 6,265,990 B1 | 7/2001 | Isogai et al. |
| 6,268,803 B1 | 7/2001 | Gunderson et al. |
| 6,269,298 B1 | 7/2001 | Seto |
| 6,278,400 B1 | 8/2001 | Cassen et al. |
| 6,289,332 B2 | 9/2001 | Menig et al. |
| 6,292,752 B1 * | 9/2001 | Franke et al. ............... 701/300 |
| 6,307,622 B1 | 10/2001 | Lewis |
| 6,317,073 B1 | 11/2001 | Tamatsu et al. |
| 6,317,075 B1 | 11/2001 | Heide et al. |
| 6,317,090 B1 | 11/2001 | Nagy et al. |
| 6,320,547 B1 | 11/2001 | Fathy et al. |
| 6,327,530 B1 | 12/2001 | Nishimura et al. |
| 6,329,952 B1 | 12/2001 | Grace |
| 6,330,507 B1 | 12/2001 | Adachi et al. |
| 6,335,705 B1 | 1/2002 | Grace et al. |
| 6,345,227 B1 | 2/2002 | Egawa et al. |
| 6,351,702 B1 | 2/2002 | Tange et al. |
| 6,360,158 B1 | 3/2002 | Hanawa et al. |
| 6,366,235 B1 | 4/2002 | Mayer et al. |
| 6,438,491 B1 | 8/2002 | Farmer |
| 2002/0044082 A1 | 4/2002 | Woodlington et al. |
| 2002/0049539 A1 | 4/2002 | Russell et al. |
| 2002/0067287 A1 | 6/2002 | Delcheccolo et al. |

FOREIGN PATENT DOCUMENTS

| | | | |
|---|---|---|---|
| EP | 0 887 658 | 12/1998 | |
| EP | 0 932 052 | 7/1999 | |
| EP | 0 978 729 A2 | 2/2000 | |
| EP | 0 982 173 | 3/2000 | |
| EP | 1 020 989 | 7/2000 | |
| FR | 2 754 604 | 5/1992 | |
| FR | 2 709 834 | 9/1993 | |
| GB | 2 267 401 | 6/1985 | |
| JP | 10-002954 | * 6/1998 | ........... G01S/13/60 |

OTHER PUBLICATIONS

G.S. Dow, et al. "Monolithic Receivers with Integrated Temperature Compensation Function", IEEE GaAs IC Symposium, 1991, pp. 267–269.

International Search Report of PCT Applications No. PCT/US01/25682 dated May 14, 2002.

International Search Report of PCT Application No. PCT/US01/25638 dated May 7, 2002.

International Search Report of PCT Application No. PCT/US01/25677 dated Apr. 17, 2002.

International Search Report of PCT Application No. PCT/US01/25676 dated Dec. 21, 2001.

Barnett, Roy I. et al. "A Feasibility Study of Stripline–Fed Slots Arranged as a Planar Array with Circular Grid and Circular Boundary", IEEE, 1989, pp. 1510–1515.

Bhattacharyya, Arum, et al. "Analysis of Srripline–Fed Slot–Coupled Patch Antennas with Vias for Parallel–Plate Mode Suppression", IEEE Transcations on Antennas and Propagation, vol. 46, No. 4, Apr. 1998, pp. 538–545.

Clouston E.N. et al. "A Triplate Stripline Slot Antenna Developed for Time–Domail Measurements on Phased Arrays", 1998, pp. 312–315.

Das, Nirod K. et al. "Multiport Scattering Analysis of General Multilayered Printed Antennas Fed by Multiple Feed Ports: Part II–Applications", IEEE, 1992, pp. 482–491.

Katehi, Pisti B. et al. "Design of a Low Sidelobe Level Stripline Fed Slot Array Covered by a Dielectric Layer", 1989, pp. 978–981.

Kimura, Yuichi et al. "Alternating Phase Single–Layer Slotted Waveguide Arrays at 25GHz Band", IEEE, 1999, pp. 142–145.

Muir, A., "Analysis of Sripline/Slot Transition", Electronics Letter, vol. 26 No. 15, pp. 1160–1161.

Sakaibara, Kunio et al. "A Single Slotted Waveguide Array for 22GHz Band Radio System Between Mobile Base Station", IEEE, 1994, pp. 356–359.

Sangster, Alan et al. "A Moment Method Analysis of a Transverse Slot Fed by a Boxed Stripline", (No Date) pp. 146–149.

Schaubert, Daniel H. et al. "Moment Method Analysis of Infinite Stripline–Fed Tapered Slot Antenna Arrays with a Ground Plane", IEEE Transactions on Antennas and Propagation, vol. 42, No. 8, Aug. 1994, pp. 1161.

Smith, Peter "Transverse Slot Radiator in the Ground–Plane of Enclosed Stripline", $10^{th}$ International Conference on Antennas and Propagation 14.17, Apr. 1997, 5 pages.

Theron, Isak Petrus et al., "On Slotted Waveguide Antenna Design at Ka–Band", IEEE Trans. vol. 32, Oct. 1984, pp. 1425–1426.

Partial International Search Report of PCT Application No. PCT/US01/25642 dated May 27, 2002.

* cited by examiner

PATH PREDICTION SYSTEM AND METHOD

CROSS REFERENCE TO RELATED APPLICATIONS

This application claims benefit of provisional Patent Application No. 60/231,113, filed Sep. 8, 2000 which application is hereby incorporated by reference in its entirely.

STATEMENTS REGARDING FEDERALLY SPONSORED RESEARCH

Not applicable.

TECHNICAL FIELD OF THE INVENTION

The present invention relates generally to automotive driver aids and, more particularly, to a path prediction system and method for use with adaptive cruise control and collision avoidance systems for an automotive vehicle, the path prediction system tracking targets in the same highway lane as the vehicle.

BACKGROUND OF THE INVENTION

In view of the improvements in the technology of automotive features, there is an ongoing opportunity to provide features that enhance driver convenience. One possible area of increased automobile convenience involves the vehicle's cruise control system. A cruise control system permits an operator to set a predetermined speed of travel and controls the vehicle to maintain the predetermined speed. Hereinafter, the driver's vehicle may be referred to as the "host vehicle."

When employing the cruise control system, as the host vehicle approaches an obstacle in the highway, such as another vehicle in the driver's lane, driver attention and intervention are necessary to override the cruise control system by actuating the host vehicle's brakes and thereby avoid a collision.

To enhance the convenience of cruise control systems, "intelligent" cruise control systems have been suggested. Intelligent cruise control systems typically include a detector for detecting obstacles in the path of the vehicle and a controller for actuating the vehicle's brakes and overriding the cruise control system in response to the detection of obstacles. Advantageously, intelligent cruise control systems can reduce the dependence on the driver for avoiding collisions.

Another possible area of increased automotive convenience is in collision avoidance systems. Like intelligent cruise control systems, collision avoidance systems generally include a detector for detecting obstacles in the path of the host vehicle and a controller for actuating the vehicle's brakes in response to detected obstacles in order to avoid collisions.

In both the intelligent cruise control and collision avoidance applications, it is necessary to provide a detector capable of accurately and reliability detecting objects in the path of the vehicle. Such a detector must be relatively insensitive to the relative location of the automobile and obstacles. One problem with cruise control systems and collision avoidance systems, however, is that they can stop detecting obstacles in front of the host vehicle as the obstacle or host vehicle turns a corner. These systems are also susceptible to reduced effectiveness under certain environmental conditions, such as precipitation, fog or haze, high humidity, and extremes of temperature.

It would, therefore, be desirable to provide a system that is capable of detecting the presence of an obstacle in the forward path of a vehicle when either or both of the vehicle and the obstacle are traveling on either a straight or curved path.

SUMMARY OF THE INVENTION

In view of the above-stated needs and in accordance with the present invention, it has been recognized that combining the need for increased automotive convenience with the usefulness and desirability of obstacle detection leads to the problem of providing a path prediction system and method which is simple, accurate, cost-effective and reliable, given the environmental and other operating conditions under which such a system and method must operate. It would, therefore, be desirable to fill the need for a system and method that provides a reliable indication of the presence of obstacles forward of and in the same highway lane as an automotive vehicle.

In accordance with the principles of the present invention, there is disclosed herein a system for detecting objects in a predicted path of a host vehicle moving on a highway lane. The detecting system includes a forward looking sensor for providing range, angle and velocity data for objects within a field of view in front of the vehicle. The detecting system also includes measuring systems for providing velocity and yaw rate data for the host vehicle. The detecting system further includes a processing system responsive to the forward looking sensor and the measuring systems for calculating an estimated path of the vehicle based on its velocity and yaw rate, calculating estimated paths for each of the objects, determining the lateral distance of each object from the predicted path of the vehicle, and classifying each object as either in or out of the highway lane of the vehicle.

In a preferred embodiment of the present invention, the forward looking sensor comprises a radar system and the yaw rate measuring system comprises a gyrocompass or other angular rate sensor.

Further in accordance with the principles of the present invention, there is disclosed herein a method for detecting objects in a predicted path of a vehicle moving on a highway lane. The method is for use in a system including a forward looking sensor for providing range, angle and velocity data for objects within a field of view in front of the vehicle, measuring systems for providing velocity and yaw rate data for the vehicle, and a processing system responsive to the forward looking sensor and the measuring systems. The method comprises the steps of (a) calculating an estimated path of the vehicle based on its velocity and yaw rate; (b) calculating estimated paths for each of the objects; (c) determining the lateral distance of each object from the predicted path of the vehicle; and (d) classifying each object as either in or out of the highway lane of the vehicle.

Still further in accordance with the principles of the present invention, there is disclosed herein an additional method for detecting targets in a predicted path of a host vehicle moving on a highway lane. The method is for use in a system including a forward looking radar system for providing range, angle and velocity data for targets within a field of view in front of the host vehicle, measuring systems for providing velocity and yaw rate data for the host vehicle, and a processing system responsive to the radar and measuring systems. The method comprises the steps of (a) collecting data inputs from the forward looking radar system and the measuring systems, and deriving acceleration and lateral velocity target data therefrom; (b) calculating a host vehicle path estimate from the velocity and yaw rate data; (c) propagating target position histories with the host vehicle path estimate; (d) propagating target positions forward with longitudinal and lateral target position state vectors; (e) calculating polynomial curve fits for host vehicle and target position vectors; (f) generating the predicted path by correlating host vehicle and target paths and then fusing the target paths as a weighted average; (g) comparing target cross range positions to the predicted path and classifying targets as in-lane or out-of-lane with respect to the highway lane of the host vehicle; (h) receiving updated data from the forward looking radar system; and (i) repeating steps (a) through (h) continuously.

The method cited immediately above includes a process of testing for a highway lane change by the host vehicle. This process includes confirming such a highway lane change by comparing the integrated yaw rate to each target heading coefficient to see if it is equal and opposite, confirming that the majority of targets are moving in the opposite direction of the host vehicle, and noting that the opposite direction motion has occurred at two consecutive data updates from the forward looking radar system.

BRIEF DESCRIPTION OF THE DRAWINGS

The foregoing features of the present invention may be more fully understood from the following detailed description, read in conjunction with the accompanying drawings, wherein.

Like reference numbers and designations in the various figures refer to identical or substantially identical elements.

DESCRIPTION OF THE PREFERRED EMBODIMENT

Throughout this description, the preferred embodiment and examples shown should be considered as exemplars, rather than as limitations on the present invention.

Figure 1:
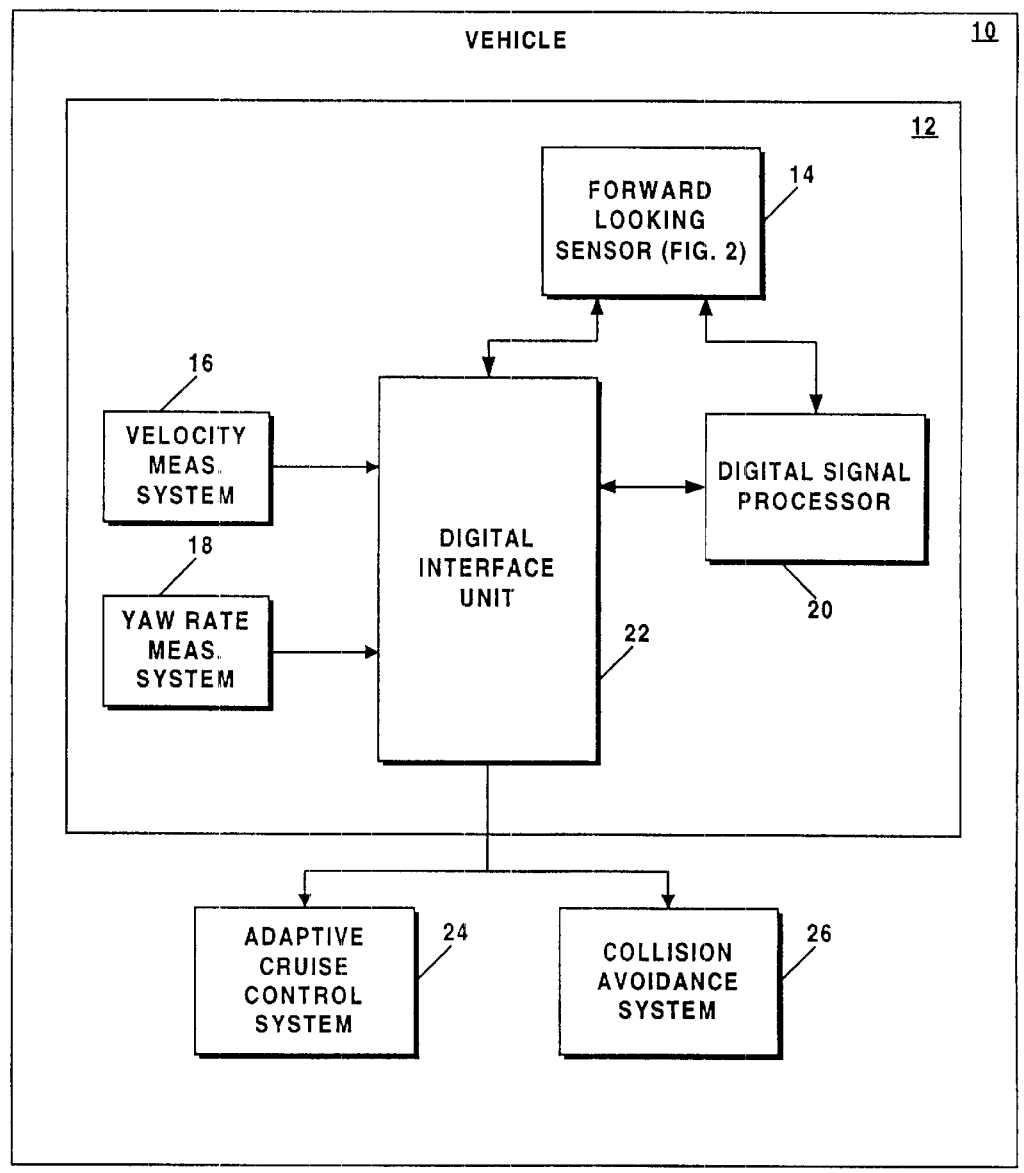
FIG. 1 illustrates a vehicle having a path prediction system in accordance with the present invention.

Referring initially to FIG. 1, there is shown a vehicle 10 including a system 12 for detecting objects in a predicted path of the vehicle as it moves along a highway lane. Hereinafter, vehicle 10 may be referred to as the "host vehicle." Detection system 12 includes a forward looking sensor 14 that provides range, velocity and angle data for objects within the field of view of forward looking sensor 14 in front of vehicle 10.

Detection system 12 also includes a velocity measuring system 16 for measuring the speed of vehicle 10. Detection system 12 further includes a yaw rate measuring system 18 for measuring the yaw rate of vehicle 10. Still further, detection system 12 includes digital interface unit 22 for communicating different forms of data signals among the several subsystems illustrated in FIG. 1. Finally, detection system 12 includes a signal processing system 20, responsive to the data outputs of forward looking sensor 14, velocity measuring system 16 and yaw rate measuring system 18, for generating signals to adaptive cruise control system 24 and collision avoidance system 26, the signals indicative of targets that have been detected in a predicted path of vehicle 10 as it moves along a highway lane.

Radar is a suitable technology for implementing an automotive forward looking sensor. One type of radar particularly suitable for this purpose is frequency modulated continuous wave (FMCW) radar. In typical FMCW radar, the frequency of the transmitted CW signal linearly increases from a first predetermined frequency to a second predetermined frequency, and then repeats the frequency sweep in the opposite direction. FMCW radar has the advantages of high sensitivity, relatively low transmitter power and good range resolution.

Figure 2:
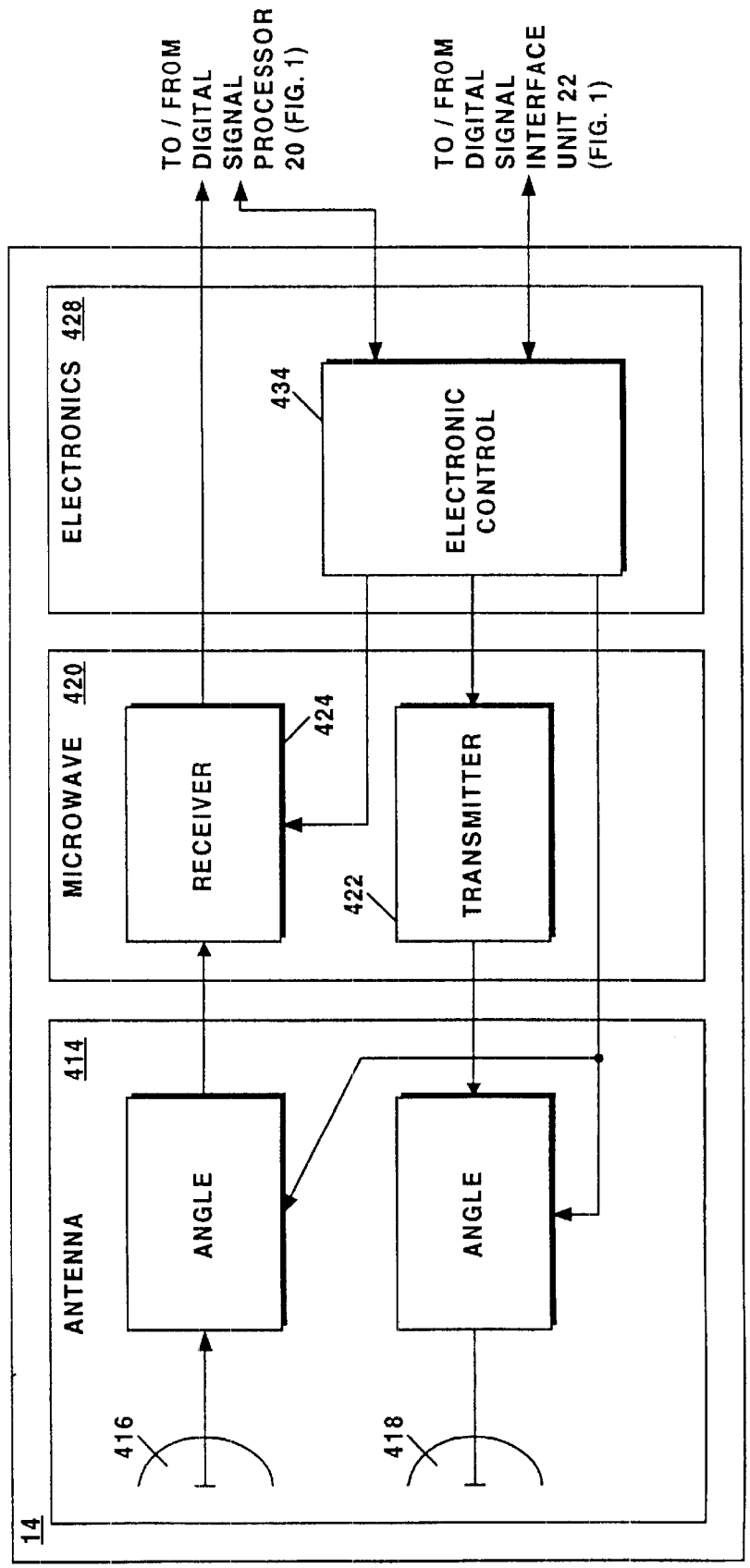
FIG. 2 illustrates a prior art radar system, which may be used as the forward looking sensor of FIG. 1.

Referring now to FIG. 2, in a preferred embodiment of the present invention, which may be of the type described in U.S. Pat. No. 5,929,802, entitled, "Automotive Forward Looking Sensor Architecture," issued Jul. 27, 1999, and which is incorporated herein by reference in its entirety, forward looking sensor 14 includes an antenna assembly 414, a microwave assembly 420 having both a transmitter 422 and a receiver 424, and an electronic assembly 428, including control circuits 434. Forward looking sensor 14 utilizes radar technology and is adapted for mounting on a vehicle to detect one or more objects, or targets in the field of view of forward looking sensor 14. In this application, the targets include other cars, trees, signs, pedestrians, etc.

In response to control signals from velocity measuring system 16 and yaw rate measuring system 18, and reflected RF signals received by forward looking sensor 14, sensor 14 provides one or more output signals characterizing each target within its field of view. These output signals relate to the range of each target in the field of view of sensor 14, the range rate, or velocity, associated with each target, and azimuth, or angle, associated with each target relative to vehicle 10.

The antenna assembly 414 includes two antennas, a receive antenna 416 for receiving RF signals and a transmit antenna 418 for transmitting RF signals. Forward looking sensor 14 may be characterized as a bi-static radar sensor since it includes separate transmit and receive antennas. Antennas 416, 418 are multi-lobed and are controlled in parallel as to point in the same direction. Various circuitry for selecting the angle of the respective antennas 416, 418 is suitable, including a multi-position switch.

The output from the receive antenna 416 is coupled to the microwave receiver 424, where one or more local oscillator signals are offset in frequency from the transmitted signal frequency by a fixed amount. The output signal of the receiver 424 is at an offset frequency, with the target frequencies either above or below it.

The receiver 424 includes an analog-to-digital (A/D) converter that samples an amplified version of the received RF signal at a rate at least twice the largest frequency out of the receiver. These signal samples are processed by an FFT in order to determine the content of the signal within various frequency ranges. The FFT outputs serve as data to digital signal processor 20. The manner by which digital signal processor 20 processes received RF signals to provide the above-described output signals to the vehicle 10 indicative of range, range rate and azimuth of a target is described in U.S. Pat. No. 6,011,507, entitled "Radar System and Method of Operating Same," issued on Jan. 4, 2000, which is incorporated herein by reference in its entirety.

In one embodiment, forward looking sensor 14 includes an antenna assembly having seven antenna beams. The use of multiple antenna beams allows multiple objects at distances in the range of about 120 meters to as much as 150 meters from forward looking sensor 14 to be accurately resolved.

Referring back again to FIG. 1, velocity measuring system 16 typically consists of a speedometer that provides a signal to digital interface unit 22 indicative of the speed of host vehicle 10. Yaw rate measuring system 18 preferably comprises a gyrocompass or similar angular rate sensor that provides a signal to digital interface unit 22 indicative of the yaw rate of host vehicle 10. Digital interface unit 22 couples data and control signals among forward looking sensor 14, velocity measuring system 16, yaw rate measuring system 18, digital signal processor 20, adaptive cruise control system 24 and collision avoidance system 26.

Signal processing system 20 is preferably a programmable digital signal processor that responds to the signals received from forward looking sensor 14 and digital interface unit 22 to perform the processes which are described in detail in the following paragraphs. The results of these processes are data that are coupled through digital interface unit 22 for application to, for example, adaptive cruise control system 24 and collision avoidance system 26, these data relating to the detection of one or more objects in the predicted path of host vehicle 10.

Figure 3:
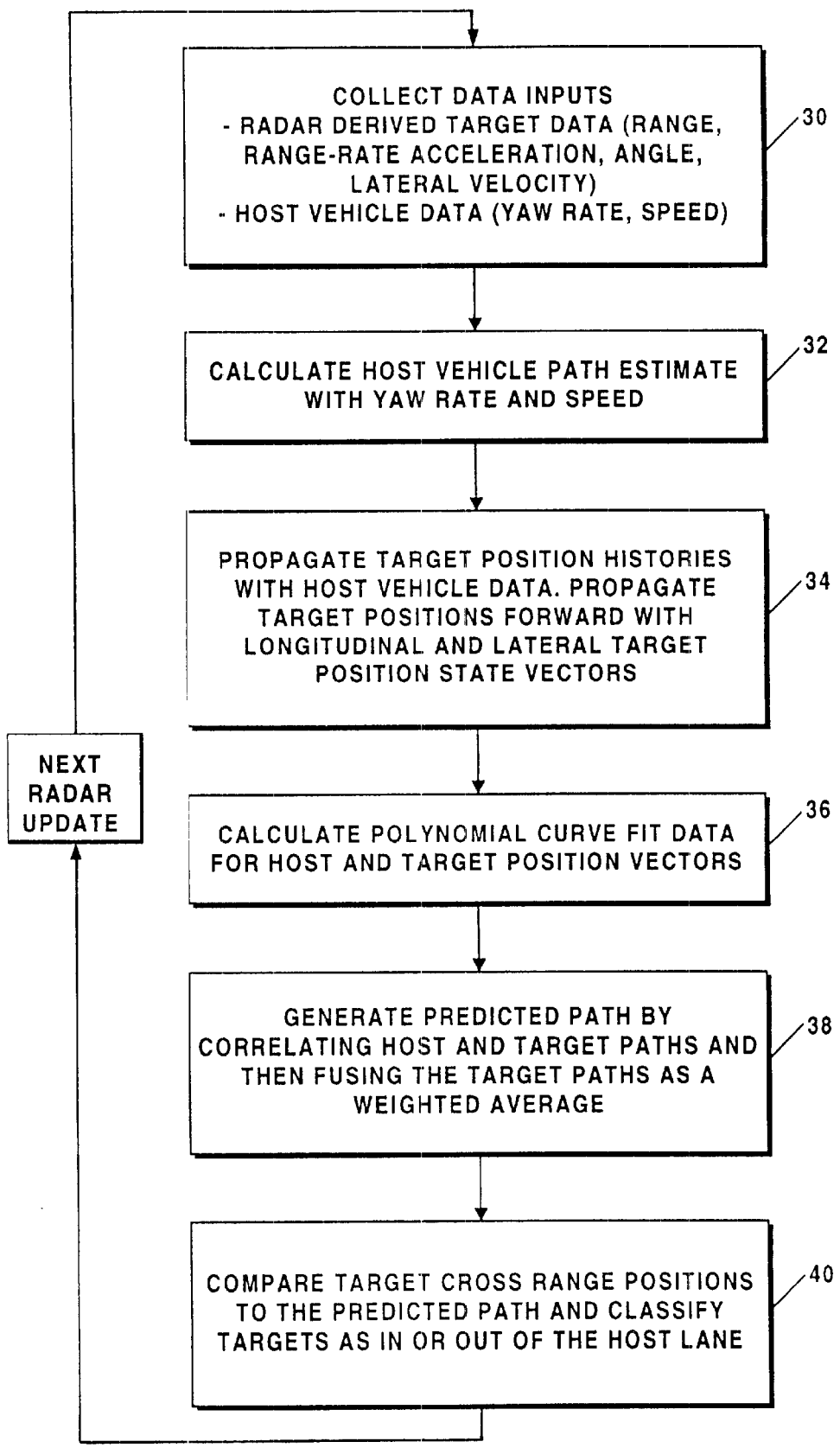
FIG. 3 is an overview flow diagram illustrating a technique employed by the signal processing system of FIG. 1 to implement target detection in the predicted path of the vehicle of FIG. 1.

Referring now to FIG. 3, there is shown an overview flow diagram illustrating a technique employed by signal processing system 20 of FIG. 1 to implement target detection in the predicted path of host vehicle 10. This flow diagram comprises of an endless loop which cycles once for each update of the radar system employed as forward looking sensor 14. In the intended use of the present invention, it is estimated that such updates will occur once every 50–100 milliseconds, or 10–20 cycles through the loop of FIG. 3 per second.

At process step 30, signal processing system 20 collects the data inputs. From forward looking sensor 14 it receives data, for each tracked target, relating to the range, angle, velocity and acceleration relative to host vehicle 10. From this information, system 20 converts the data to range, angle, velocity and acceleration. It uses the angle and the range to calculate lateral velocity. At this process step, system 20 also inputs the velocity and yaw rate of vehicle 10 from velocity measuring system 16 and yaw rate measuring system 18, respectively.

The process of FIG. 3 continues with process step 32 in which a path for host vehicle 10 is estimated based on its velocity and yaw rate. The host vehicle path estimate is calculated by application of a 2-state Kalman filter to track curvature parameters and propagate a host position vector forward in range. The details of this process will be more completely described in a later discussion in relation to FIG. 4.

The process of FIG. 3 continues with process step 34 in which, for each target, position histories are propagated based on host vehicle speed and yaw rate, and target positions are propagated forward with longitudinal and lateral position state vectors. The details of this process will be more completely described in a later discussion in relation to FIG. 5.

The process of FIG. 3 continues with process step 36 in which a curve fit is applied to the host vehicle curvature rate data and, for each target, a curve is generated using target history data and data propagated forward from position and velocity estimates in the longitudinal and lateral directions. The details of this process will be more completely described in a later discussion in relation to FIG. 6.

The process of FIG. 3 continues with process step 38 in which a predicted path is generated by correlating host and target paths and fusing weighted target paths. The details of this process will be more completely described in a later discussion in relation to FIG. 7.

The process of FIG. 3 continues with a final process step 40 in which target cross range positions are compared to the predicted path of host vehicle 10 and the targets are classified as either in or out of the host lane. The details of this process will be more completely described in a later discussion in relation to FIG. 14.

After completion of process step 40, there is an update of the radar system employed as forward looking sensor 14, and signal processing system enters process step 30 with the updated target data.

Figure 4:
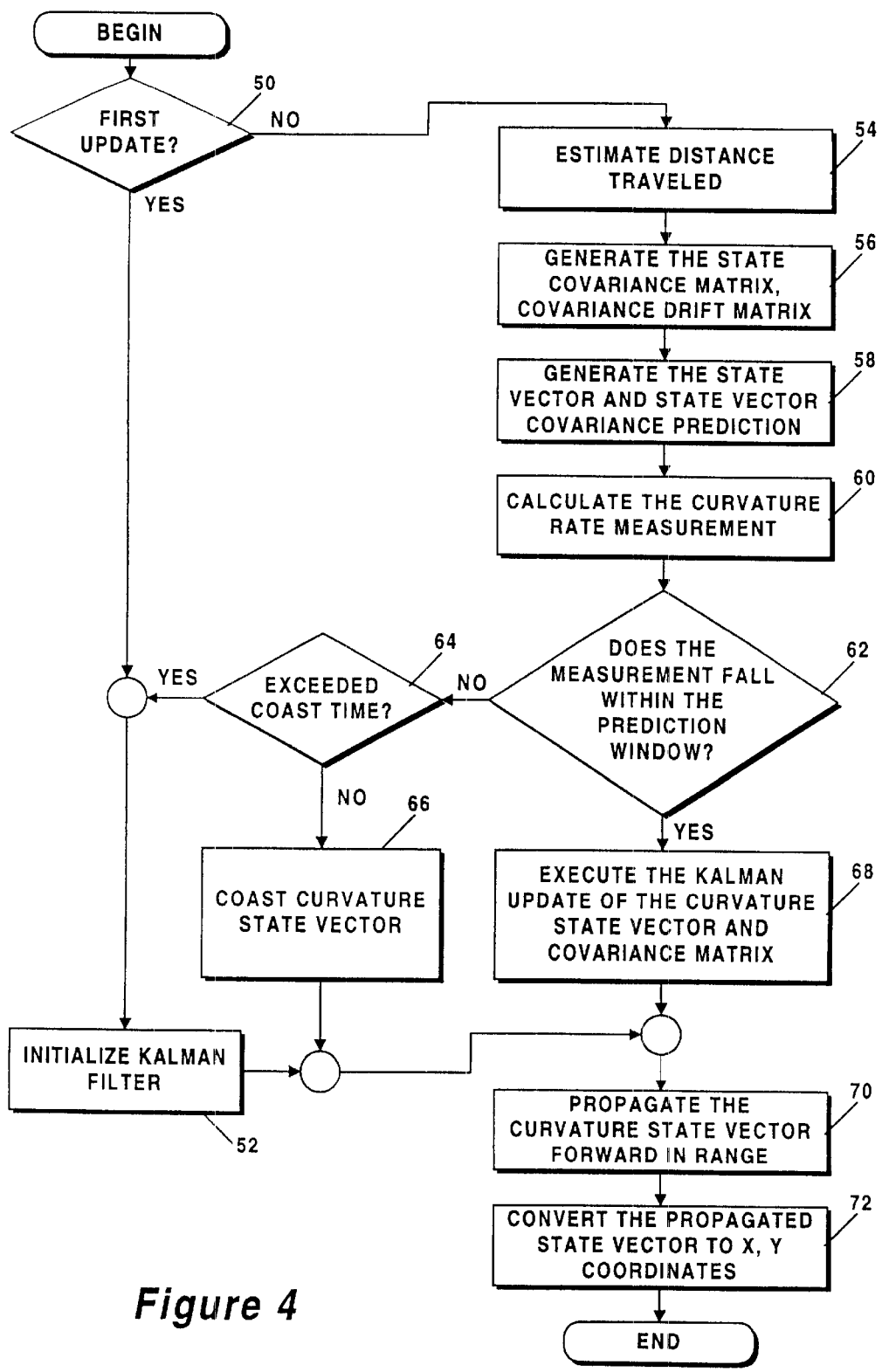
FIGS. 4 through 7 and 14 are flow diagrams providing more detailed descriptions of the processing steps of the overview flow diagram of FIG. 3.

Referring now to FIG. 4, there is shown a detailed flow diagram of the process of step 32 of FIG. 3. In this step, a path for host vehicle 10 is estimated based on its velocity and yaw rate. The host vehicle path estimate is calculated by application of a 2-state Kalman filter to track curvature parameters and propagate a host position vector forward in range. The curvature state vector consists of curvature rate (degrees/meter) and curvature rate change (degrees/meter$^2$). The Kalman filter averages the curvature rate from update to update by weighting according the variances of measurement. It filters out extremes of the noise, e.g., spikes of yaw rate caused by bumps in the highway. A curvature rate measurement is generated by dividing the yaw rate by the vehicle speed. After filtering the curvature state vector, it is propagated forward with the state transition matrix and the path is propagated forward from the center of the host vehicle in fixed-length steps along an arc. In the present example, the steps are 10 meters in length.

The process of step 32 begins at decision step 50 which queries whether the current update is the first update. If it is, control passes to step 52 in which the Kalman filter is initialized, and control passes to step 70. If it is not the first update, control passes to step 54 where the distance the host vehicle has traveled is estimated. The elapsed time since the last estimate is computed, and this elapsed time is used with the host vehicle's speed to compute the distance traveled. In the step that follows, step 56, the distance traveled is used to define a state transition matrix and a state covariance drift matrix. At step 58, the state transition and covariance drift matrices are used to predict the state vector and state vector covariance. The state vector is then used to predict the measurement. At step 60, the curvature rate measurement and measurement variance are computed using the yaw rate, velocity and variances.

At decision step 62, a measurement prediction window must be determined. The window defines a two-sided bound for which measurements will be accepted. In this example, the measurement is the same quantity as the first element in the state vector, and the threshold bound is three times the square root of that state element variance plus the measurement noise estimate. A determination is made as to whether to perform a measurement update by comparing the difference of the measurement and the predicted measurement with the threshold.

If the update is to be executed, control passes to process step 68 where the Kalman gain is computed and the state vector and covariance are updated. If the update is not to be executed, control passes to decision step 64 where the elapsed time is tested since the last valid update. If some maximum time has been exceeded, then the Kalman filter is reinitialized at process step 52 and control passes to process step 70. If the maximum time has not been exceeded, control passes to process step 66 where the state vector and covariance are taken to be the prediction values. Control then passes to process step 70 where the current curvature rate and curvature rate change are propagated out along a curved path at fixed step sizes.

At process step 72, the x- and y-coordinates for each propagated position are determined using a Cartesian coordinate system where x is positive to the right of host vehicle 10 and y is straight ahead of host vehicle 10. At the conclusion of process step 72, control passes to process step 34 of FIG. 3.

Figure 5:
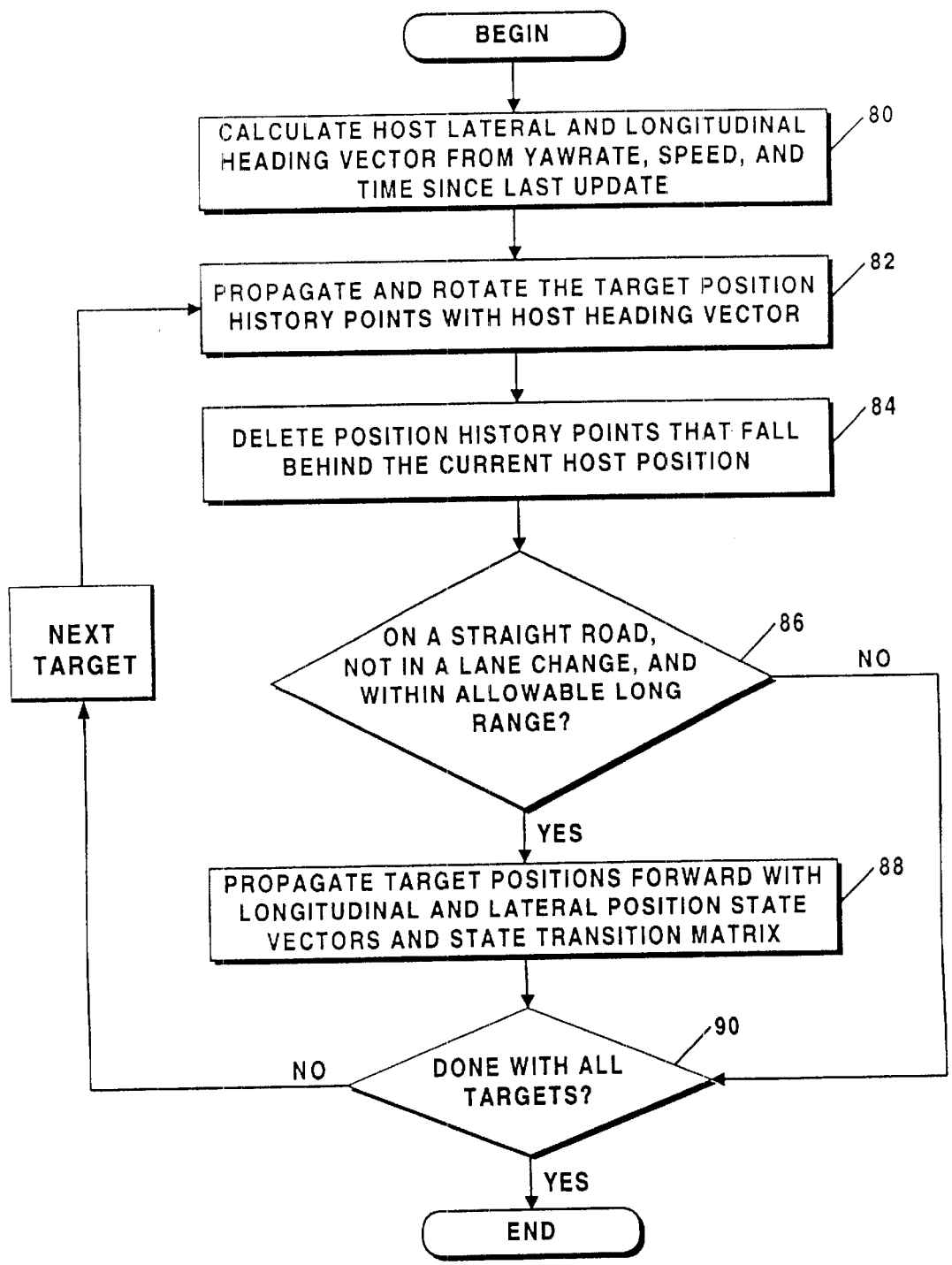

Referring now to FIG. 5, there is shown a detailed flow diagram of the process of step 34 of FIG. 3 in which, for each target, position histories are propagated based on host vehicle speed and yaw rate, and target positions are propagated forward with longitudinal and lateral position state vectors.

At the initial process step 80, the longitudinal and lateral heading vector of host vehicle 10 is calculated from the yaw rate, velocity and time elapsed since the last update. At process step 82, for the first target, the target position history points are propagated and rotated in accordance with the updated heading vector of host vehicle 10. At step 84, any points of the target position history that have fallen behind host vehicle, i.e., the x coordinate is negative, are deleted from the history. In the exemplary embodiment, propagating target position histories includes calculating the target's previous position relative to the longitudinal axis of said host vehicle, filling a vector of history points, and dropping points as the longitudinal value drops below zero.

At decision step 86, the process queries whether the target is on a straight road, not executing a lane change and within an allowable range. If any of these conditions is false, control passes to decision step 90. If all of these conditions are true, control passes to process step 88 where the target positions are propagated forward with longitudinal and lateral target position state vectors and a state transition matrix. Control then passes to decision step 90 which queries whether all targets have undergone the propagation updates of steps 82–88. If not, control returns to step 82 for the next target. If all targets have been so propagated, decision step 90 passes control to process step 36 of FIG. 3.

Figure 6:
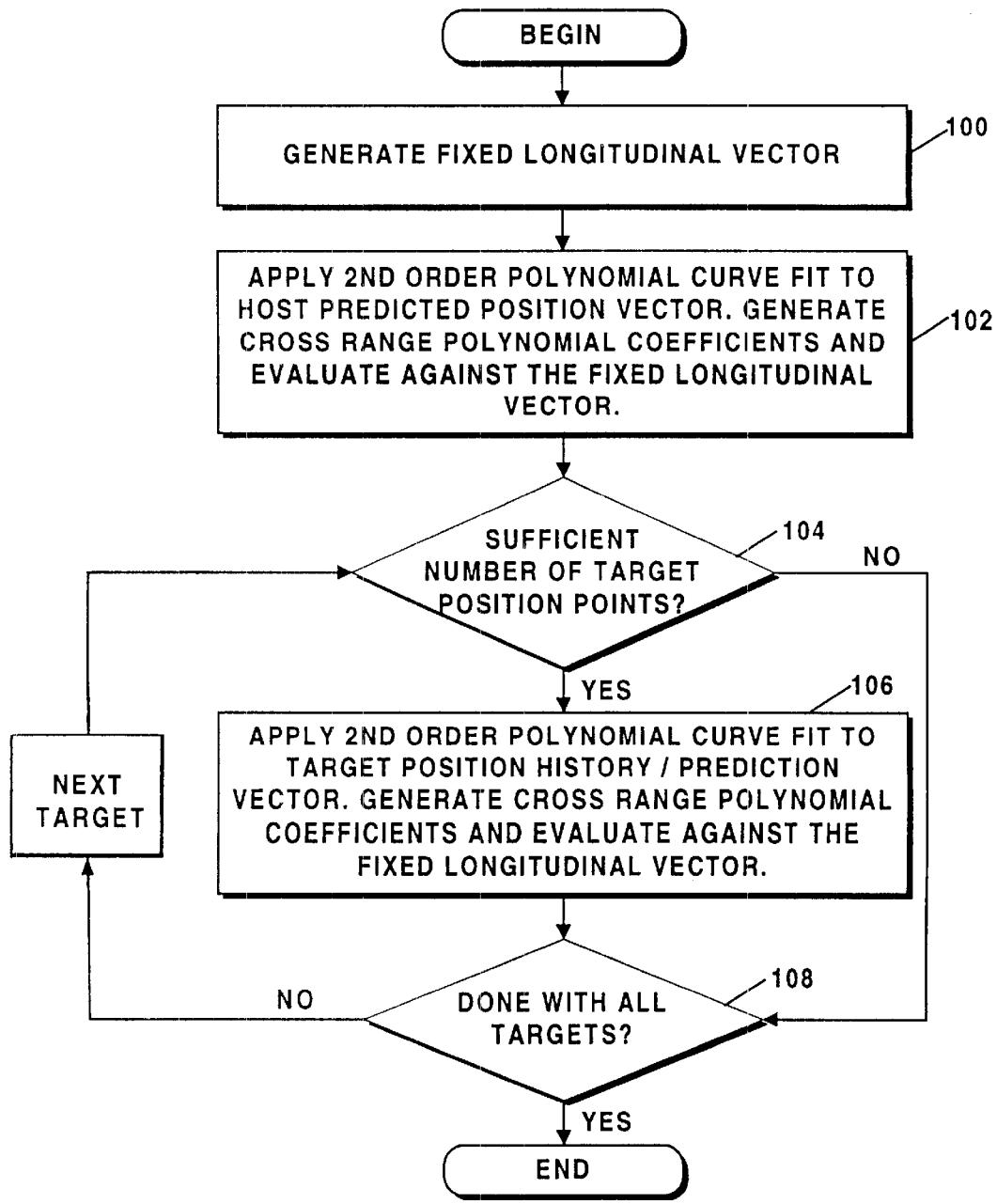

Referring now to FIG. 6, there is shown a detailed flow diagram of the process of step 36 of FIG. 3. In this process a curve fit is applied to the host vehicle curvature rate data and, for each target, a curve is generated using target history data and data propagated forward from position and velocity estimates in the longitudinal and lateral directions. The curves are both second-order polynomials of the form $$x = c_0 + c_1 \cdot y + c_2 \cdot y^2,$$

where x is the lateral direction and y is the longitudinal direction, and where $c_0$, $c_1$ and $c_2$ are the $0^{th}$, $1^{st}$, and $2^{nd}$ order polynomial coefficients, respectively, that specify the shape of the curve in the cross range dimension.

The initial step is process step 100 that generates a fixed longitudinal vector. This is followed by process step 102 that applies a second-order polynomial curve fit to the host vehicle predicted position vector. Cross range polynomial coefficients ($c_0$, $c_1$ and $c_2$) are generated, and evaluated against the fixed longitudinal vector.

Decision step 104 queries whether a sufficient number of target position points have been read. In the present example, at the aforementioned radar scan rate of 10–20 radar updates per second, a two-second period provides 10 to 20 target position points. This is deemed sufficient for a satisfactory curve fit. If a sufficient number of target position points have not been read, control passes to decision step 108. If a sufficient number have been read, control passes to process step 106 where a second-order polynomial curve fit is applied to the target position history/prediction vector. Cross range polynomial coefficients ($c_0$, $c_1$ and $c_2$) are generated, and evaluated against the fixed longitudinal vector.

Control then passes to decision step 108 which queries whether all targets have been examined. If not, control passes back to decision step 104 for the next target. If all targets have been examined, decision step 108 passes control to process step 38 of FIG. 3.

Figure 7:
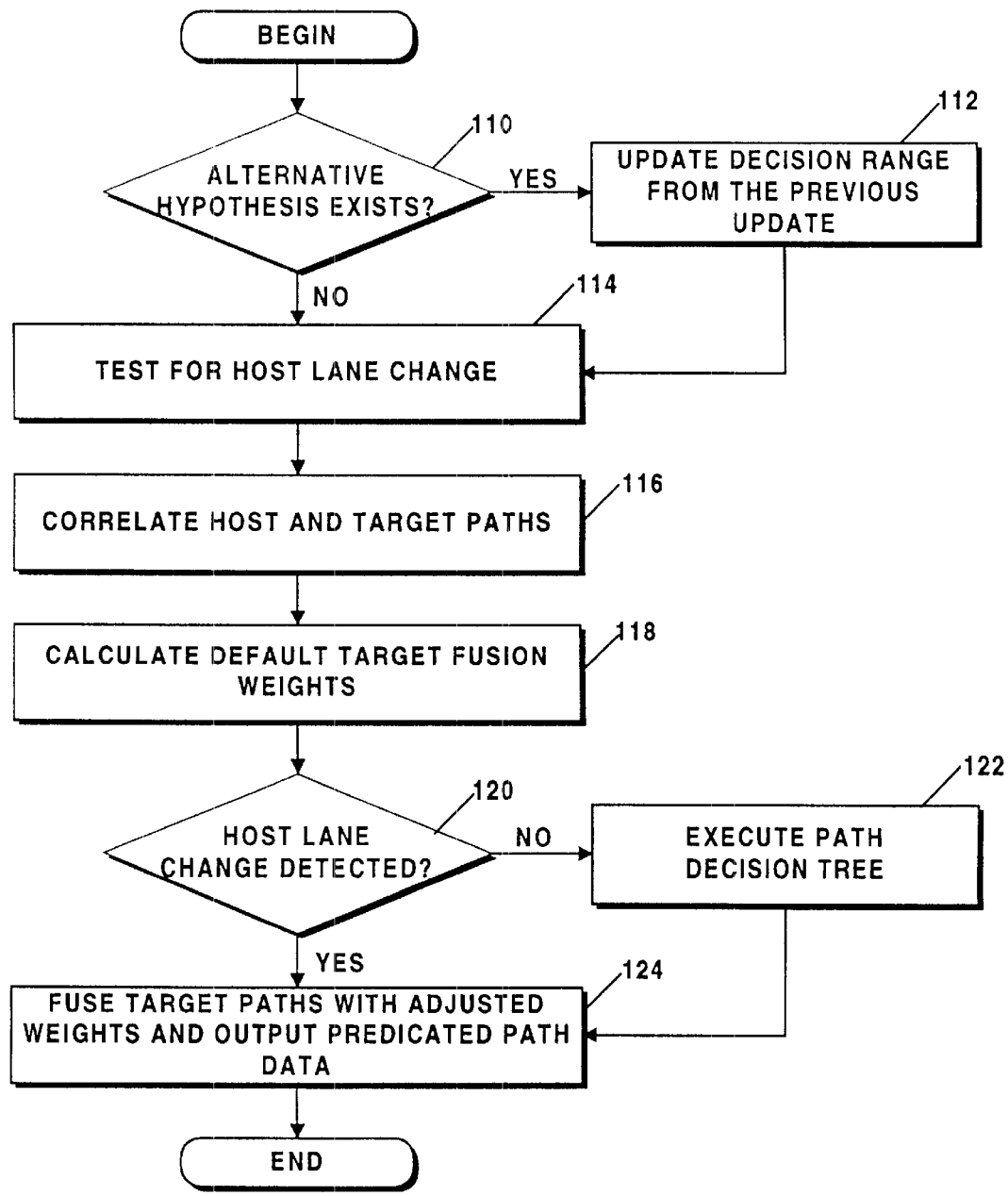

Referring now to FIG. 7, there is shown a detailed flow diagram of the process of step 38 of FIG. 3. Process step 38 generates a predicted path by correlating host and target paths and fusing weighted target paths.

The initial step is decision step 110 that queries whether alternate path hypotheses exist. A discussion of alternate path hypotheses is provided in the text relating to FIG. 10. If an alternate path hypothesis exists, process step 112 updates the decision range from the previous update. The details of process step 112 will be more completely described in a later discussion in relation to FIG. 8. Following step 112, control passes to process step 114. If alternate hypotheses do not exist, process step 114 tests to determine if host vehicle 10 is executing a lane change. The details of process step 114 will be more completely described in a later discussion in relation to FIG. 9.

Control now passes to process step 116, which correlates the host and target paths. The details of process step 116 will be more completely described in a later discussion in relation to FIGS. 10a through 10c. Following step 116, process step 118 generates fusion weights, by default, based on the range of the target from host vehicle 10. The details of process step 118 will be more completely described in a later discussion in relation to FIG. 11.

Following step 118, decision step 120 queries whether a lane change of host vehicle 10 has been detected. If not, process step 122 executes a path decision tree, which will be more completely described in a later discussion in relation to FIGS. 12a through 12c. Control then passes to step 124 where the target paths are fused and the predicted path data is generated. If decision step 120 determines that a lane change has been detected, control passes to process step 124 where the target paths are fused and the predicted path data is generated. The details of process step 124 will be more completely described in a later discussion in relation to FIG. 13. At the conclusion of process step 124, control passes to process step 40 of FIG. 3.

Figure 8:
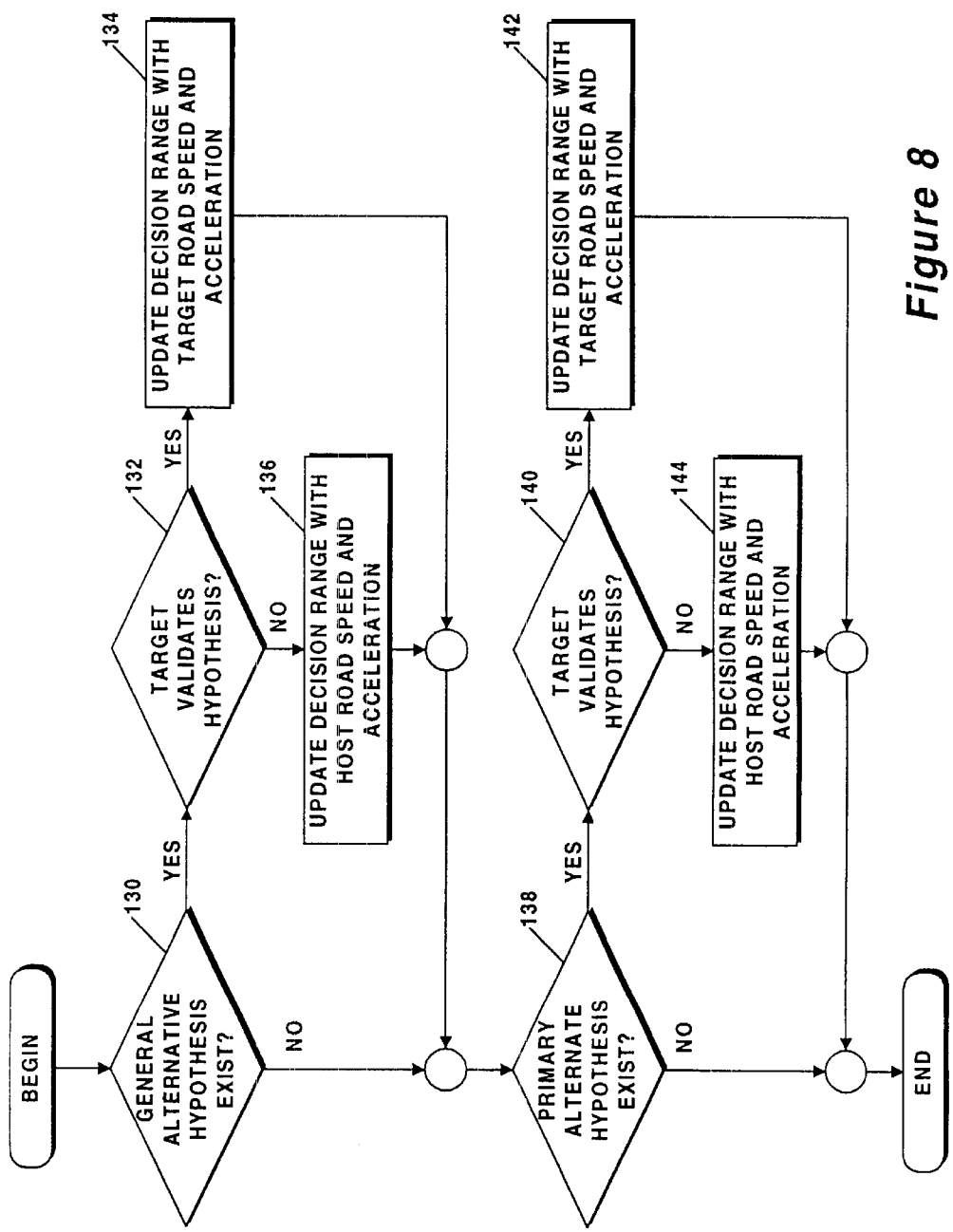
FIGS. 8, 9, 10a through 10c, 11, 12a through 12c, and 13 are flow diagrams providing more detailed descriptions of the processing steps of the flow diagram of FIG. 7.

Referring now to FIG. 8, there is shown a detailed flow diagram of the process of step 112 of FIG. 7. The initial step is decision step 130 that queries whether a general alternate hypothesis exists. If so, control passes to decision step 132 that queries whether a target validates this hypothesis. If so, process step 134 updates the decision range with the road speed and acceleration of the target, and control passes to decision step 138. If the result from decision step 132 is that a target does not validate the hypothesis, then control passes to process step 136 that updates the decision range with the road speed and acceleration of host vehicle 10, and control passes to decision step 138. If the result from decision step 130 is that no general alternate hypothesis exists, control passes to decision step 138.

Decision step 138 queries whether a primary alternate hypothesis exists. The closest in-lane target to the host is defined as the primary target. If a primary alternate hypothesis exists, control passes to decision step 140 which queries whether a target validates this hypothesis. If so, process step 142 updates the decision range with the road speed and acceleration of the target, and control passes to process step 114 of FIG. 7. If the result from decision step 140 is that a target does not validate the hypothesis, then control passes to process step 144 that updates the decision range with the road speed and acceleration of host vehicle 10, and control passes to process step 114 of FIG. 7. If the result from decision step 138 is that no primary alternate hypothesis exists, control passes to process step 114 of FIG. 7.

Figure 9:
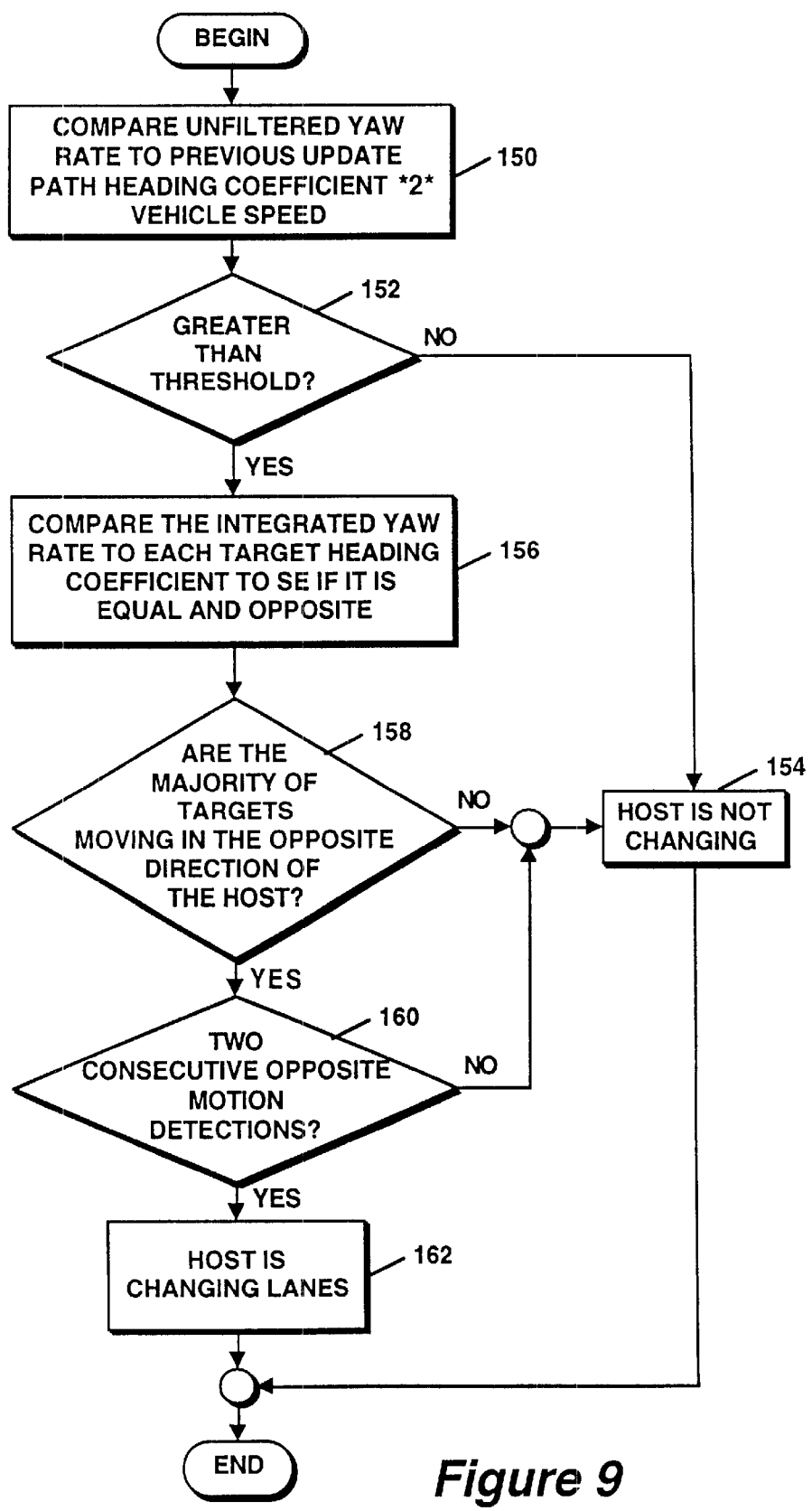

Referring now to FIG. 9, there is shown a detailed flow diagram of the process of step 114 of FIG. 7. This is a routine that tests for lane changes by host vehicle 10. A first indication of a lane change is a non-zero heading angle. A non-zero heading is indicative of a deviation from the predicted path or, equivalently, the predicted curvature rate. The routine must rotate and correlate the targets by the heading angle change. When host vehicle 10 performs a lane change, all targets will rotate by the heading change. If the targets are rotated back, the rotated positions should correlate to their previous positions. This is implemented by comparing the target path first order polynomial coefficient, $c_1$, to the integrated yaw rate, i.e., the host vehicle heading irrespective of road geometry.

The initial step is a process step 150, in which the unfiltered yaw rate measurement of host vehicle 10 is compared to the previous update path heading coefficient multiplied by twice the velocity of host vehicle 10. Decision step 152 then queries whether this value exceeds a predetermined threshold. If the answer is negative, control passes to process step 154, which notes that host vehicle 10 is not changing lanes.

If the values compared in step 150 exceed the threshold in decision step 152, control passes to process step 156 which compares the integrated yaw rate of host vehicle 10 to each target heading coefficient to determine if it is equal and opposite. At decision step 158, if the majority of targets are not moving in a direction opposite to that of host vehicle 10, then host vehicle 10 is not changing lanes and control passes to step 154. If the answer at decision step 158 is positive, control passes to decision step 160, which queries whether there have been two consecutive detections on successive radar updates of such opposite motion. In this example, two consecutive detections of a majority of targets moving in a direction opposite to that of host vehicle 10 are required to validate a lane change by host vehicle 10. If the answer at decision step 160 is negative, the validation condition has not yet been met and control passes to process step 154. If the answer at decision step 160 is positive, the validation condition has been met and control passes to process step 162, which notes that host vehicle 10 is executing a lane change. Following either step 154 or step 162, control passes to process step 116 of FIG. 7.

Figure 10A:
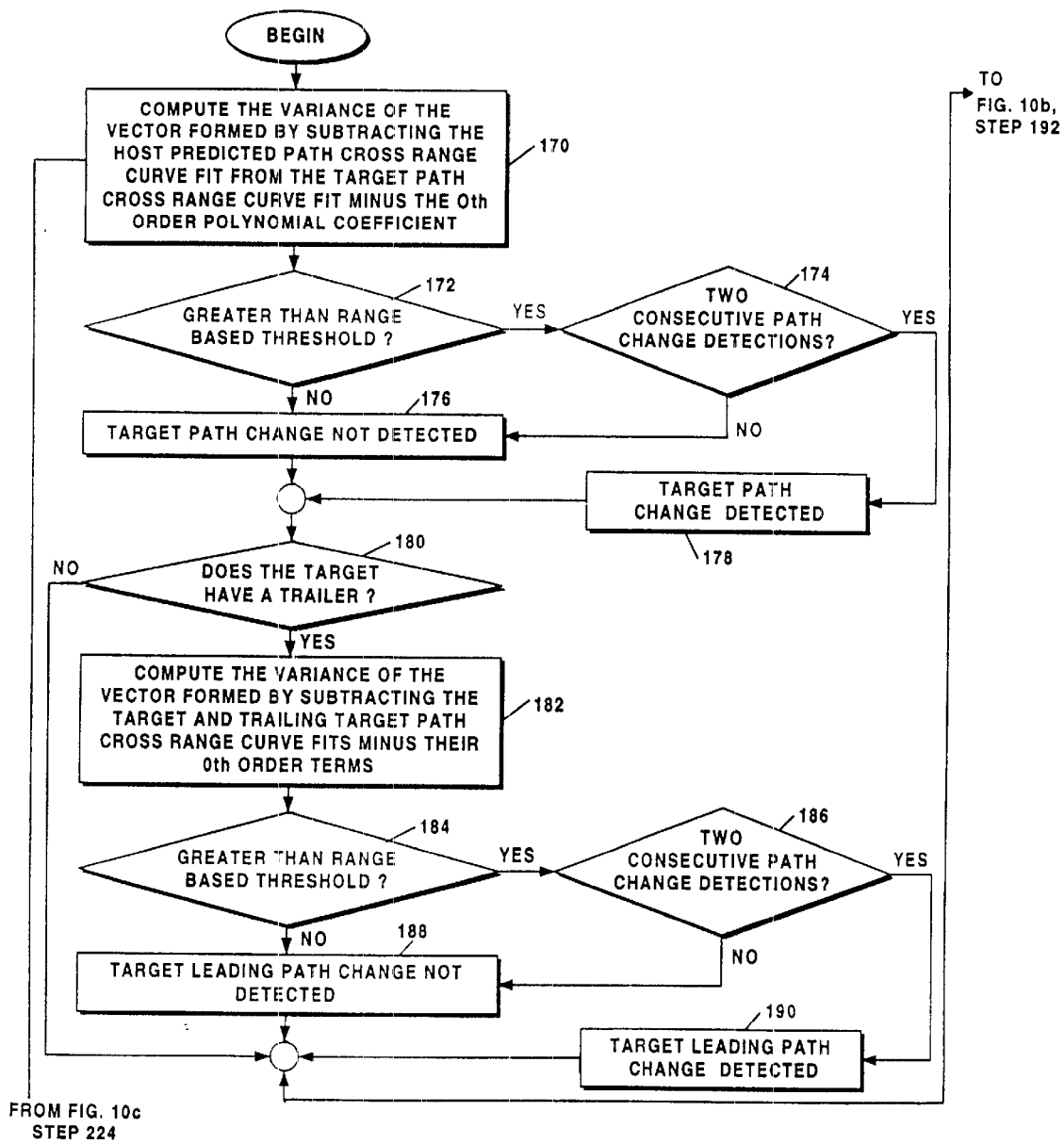
Figure 10B:
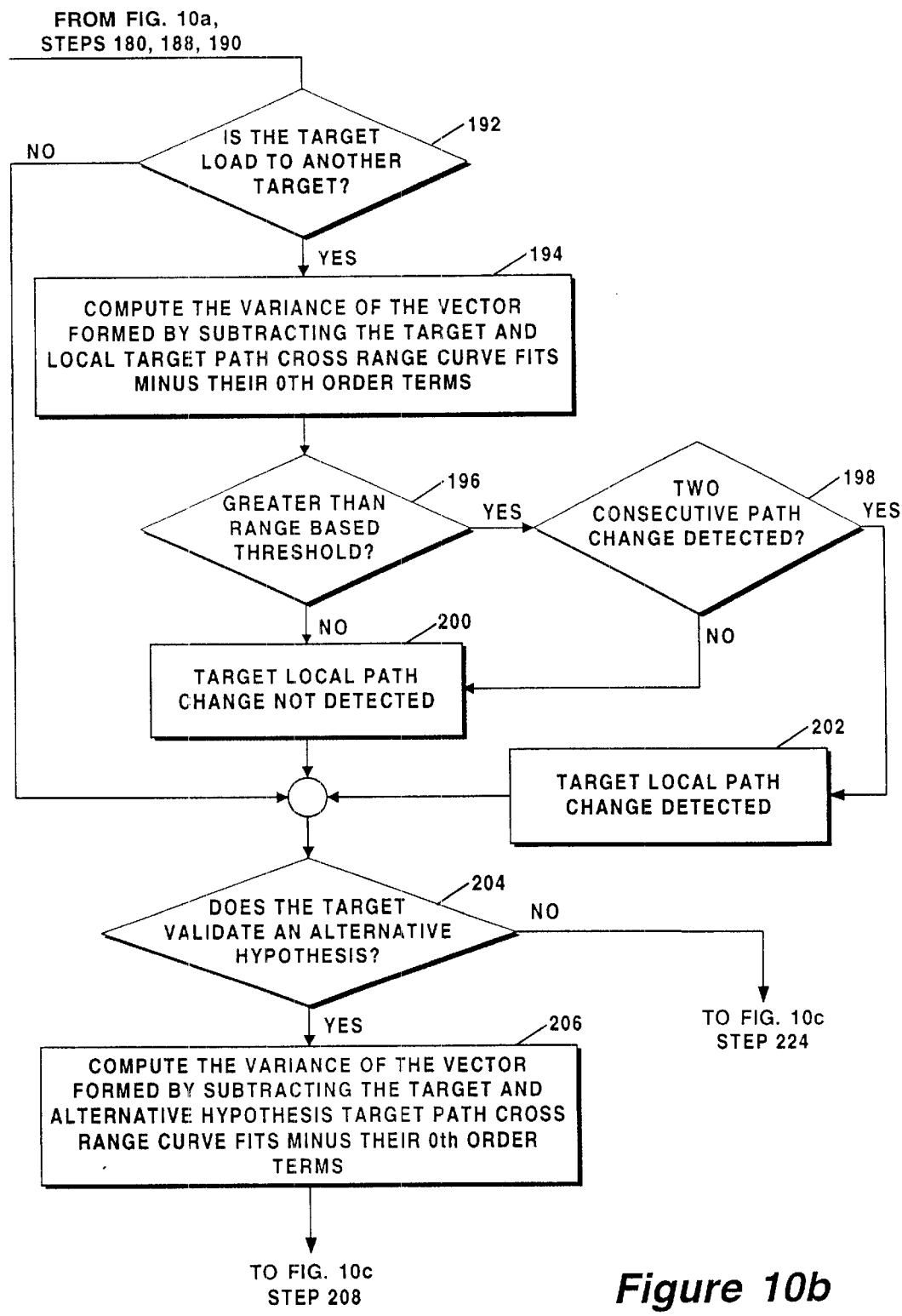
Figure 10C:
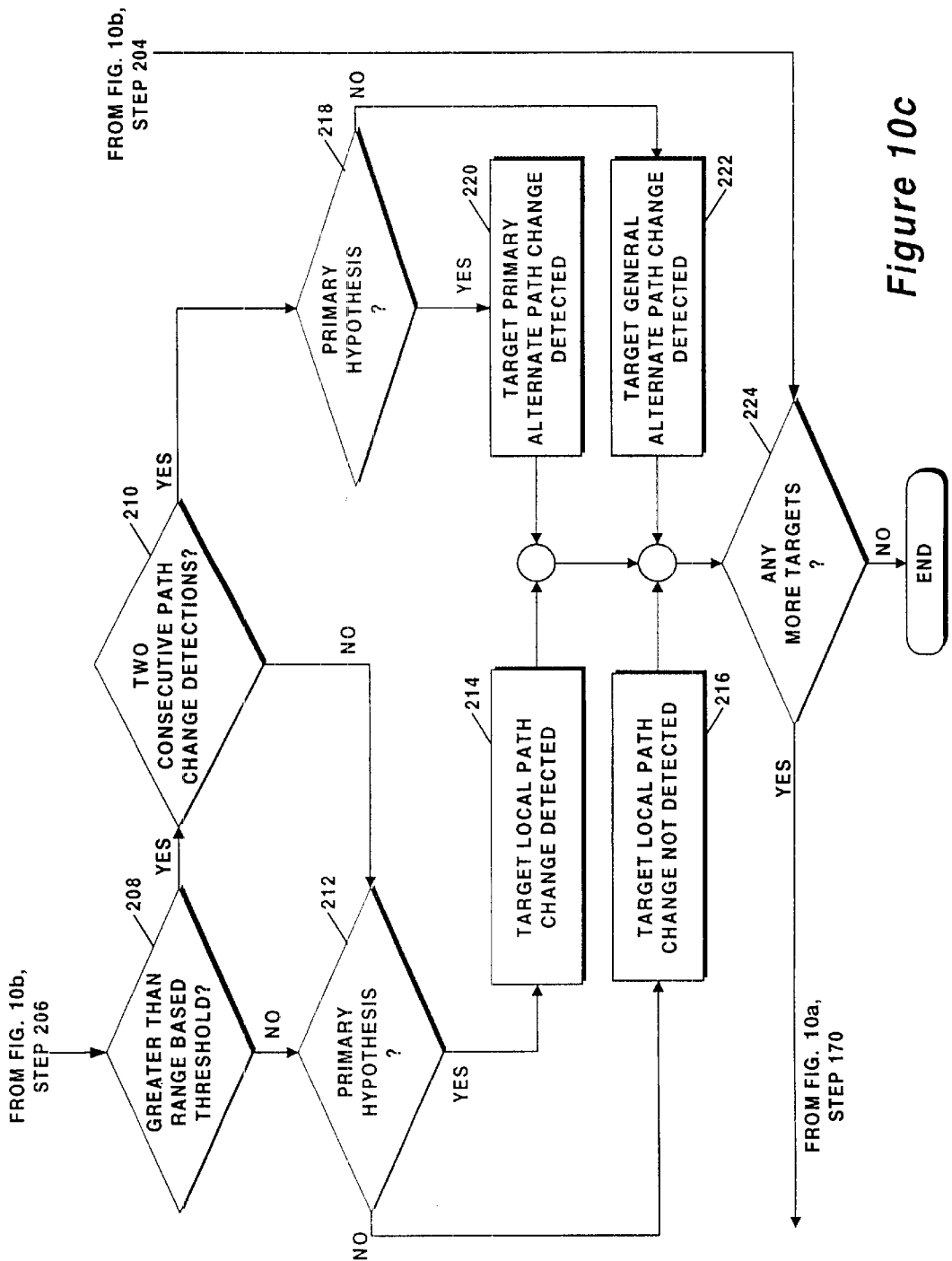

Referring now to FIGS. 10a through 10c, which comprise, in fact, a single flow diagram broken out onto three sheets for readability and which is referred to collectively as FIG. 10, there is shown a detailed flow diagram of the process of step 116 of FIG. 7. This routine correlates target paths to the host vehicle path by examining the variance of the difference between path-fit cross range for the targets and yaw rate of host vehicle 10. Starting with the target furthest in range, referred to as the "pack leader," if this target deviates from the host vehicle path, the system looks for a co-located target, defined, in the present example, by a moving target within 2.5 meters (based on a typical highway speed of 25 meters per second and a radar update rate of 10 per second). If the co-located target is also deviating from the host vehicle path, and the target paths are correlated, then the program assumes a road deviation. This causes the weight in the path fusion to be increased so as to follow the deviation. If there is no neighboring target, then it is assumed that there is a road curvature change, and an alternate path hypothesis is set up. The active path will follow the target. The alternate path will ignore the target. The next closest target in range verifies or nullifies the path change. If, at a time calculated with target velocity and target range differential difference, the next target does not follow the lead target, but instead follows the alternate path, the program selects the alternate path and assumes the lead target is performing a lane change or exiting the highway.

The initial step is process step 170, which computes the variance of the vector formed by subtracting the host vehicle predicted path cross range curve fit from the target path cross range curve fit minus the $0^{th}$ order polynomial coefficient, $c_0$. Decision step 172 then queries whether the variance from step 170 is greater than a threshold based on target range. If so, decision step 174 queries whether there have been two consecutive path change detections in successive radar updates. If so, process step 178 marks the target as having a path change, and control passes to decision step 180. If not, process step 176 marks the target as not having a path change, and control passes to decision step 180. If the result from decision step 172 is that the variance from step 170 is not greater than a threshold based on target range, process step 176 marks the target path as not having a path change, and control passes to decision step 180.

Decision step 180 queries whether there is another vehicle trailing the target. If not, control passes to decision step 192. If there is a trailing vehicle, process step 182 computes the variance of the vector formed by subtracting the target and trailing target path cross range curve fits minus their $0^{th}$ order polynomial coefficients, $c_0$. Decision step 184 then queries whether the variance from step 182 is greater than a range-based threshold. If so, decision step 186 queries whether there have been two such detections on consecutive radar updates. If so, process step 190 marks the target as having a lead-lag path change, and control passes to decision step 192. If not, process step 188 marks the target as not having a lead-lag path change, and control passes to decision step 192. If the result from decision step 184 is that the variance from step 182 is not greater than a range-based threshold, process step 188 marks the target as not having a lead-lag path change, and control passes to decision step 192.

Decision step 192 queries whether there is another vehicle co-located to the target. If not, control passes to decision step 204. If there is a co-located vehicle, process step 194 computes the variance of the vector formed by subtracting the target and local target path cross range curve fits minus their $0^{th}$ order polynomial coefficient, $c_0$. Decision step 196 then queries whether the variance from step 194 is greater than a range-based threshold. If so, decision step 198 queries whether there have been two such detections on consecutive radar updates. If so, process step 202 marks the target as having a local path change, and control passes to decision step 204. If not, process step 200 marks the target as not having a local path change, and control passes to decision step 204. If the result from decision step 196 is that the variance from step 194 is not greater than a range-based threshold, process step 200 marks the target as not having a local path change, and control passes to decision step 204.

Decision step 204 queries whether the target validates an alternate hypothesis. If not, control passes to decision step 224. If the target does validate an alternate hypothesis, process step 206 computes the variance of the vector formed by subtracting the target and alternate hypothesis target path cross range curve fits minus their $0^{th}$ order polynomial coefficient, $c_0$.

Decision step 208 then queries whether the variance from step 206 is greater than a range-based threshold. If so, decision step 210 queries whether there have been two such detections on consecutive radar updates. If so, decision step 218 queries whether the validated hypothesis is a primary hypothesis. If so, process step 220 marks that a target primary alternate path change has been detected. Control then passes to decision step 224.

If decision step 218 finds that the validated hypothesis is not a primary hypothesis, process step 222 marks that a target general alternate path change has been detected. Control then passes to decision step 224. If decision step 210 finds that there have not been two consecutive path change detections, control passes to decision step 212.

If decision step 208 finds that the variance from step 206 is not greater than a range-based threshold, control passes to decision step 212. Decision step 212 queries whether the validated hypothesis is a primary hypothesis. If so, process step 214 marks that a target primary alternate path change has not been detected. Control then passes to decision step 224. If decision step 212 finds that the validated hypothesis is not a primary hypothesis, process step 216 marks that a target general alternate path change has not been detected. Control then passes to decision step 224.

Decision step 224 queries whether there are any more targets to test. If so, control passes back to step 170 at the top of the routine. If there are no more targets, control returns to step 118 of FIG. 7.

Figure 11:
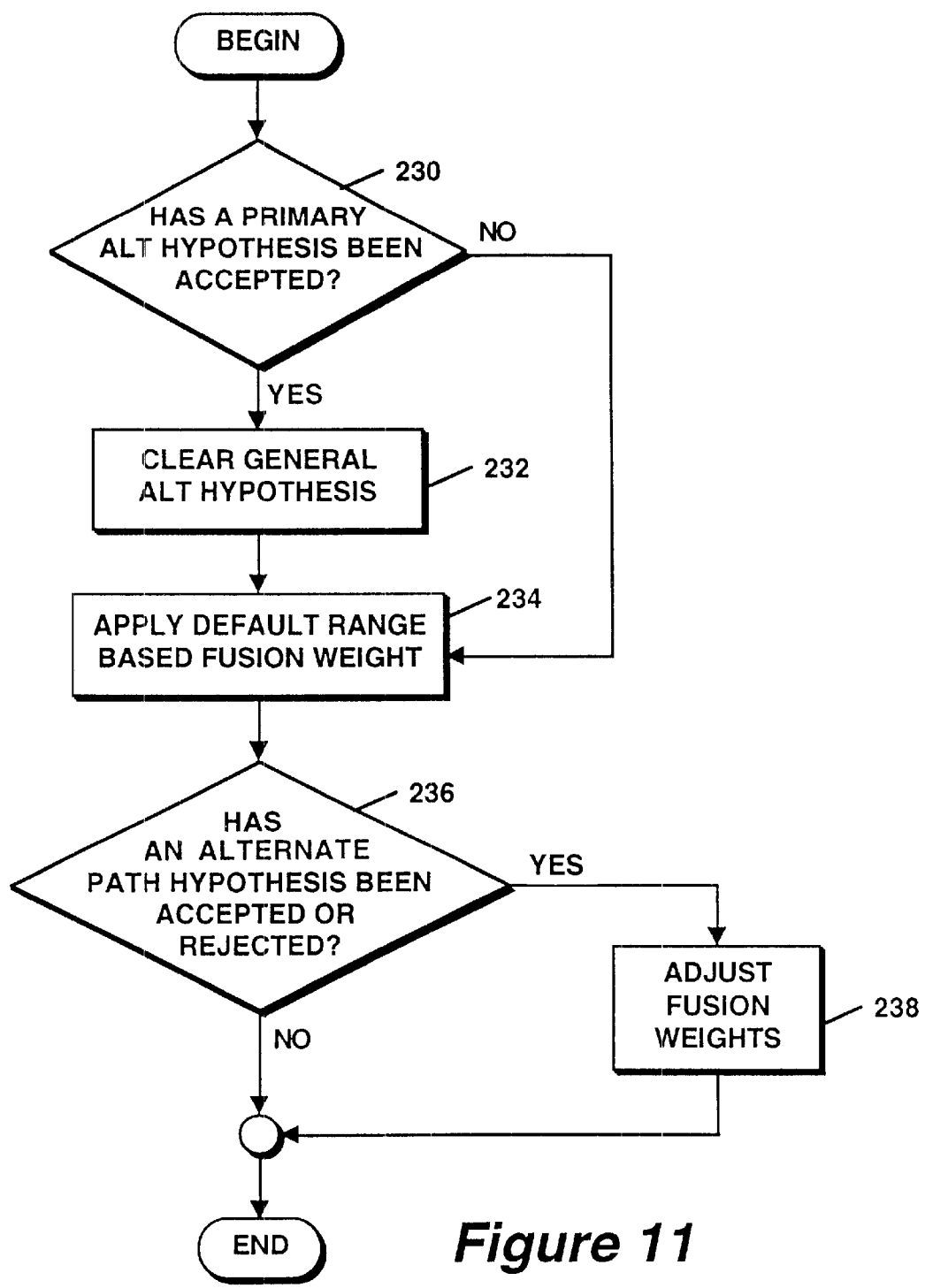

Referring now to FIG. 11, there is shown a detailed flow diagram of the process of step 118 of FIG. 7. In this step, fusion weights are generated, by default, based on the range of the target from host vehicle 10. The weights will be adjusted in subsequent operations described in relation to FIGS. 12a through 12c. In this example, the default weights are assigned a value of one for the range between host vehicle 10 and the present position of the target, and monotonically decreasing values beyond the target to the end of the range of radar system 14. Thus, it may be seen that the closest target exerts the greatest influence when the weights are fused.

The initial step is decision step 230, which queries whether a primary alternate hypothesis has been accepted. If so, process step 232 clears the general alternate hypothesis and control passes to process step 234. If no primary alternate hypothesis has been accepted, control passes directly to step 234.

At process step 234, the above-mentioned default range-based weight is applied. Following this, decision step 236 queries whether an alternate path hypothesis has been accepted or rejected. If not, control passes back to decision step 120 of FIG. 7. If an alternate path hypothesis has been accepted or rejected, step 238 adjusts the fusion weights. If a target has been rejected due to a hypothesis, its weight is set to zero. Following step 238, control passes back to decision step 120 of FIG. 7.

Figure 12A:
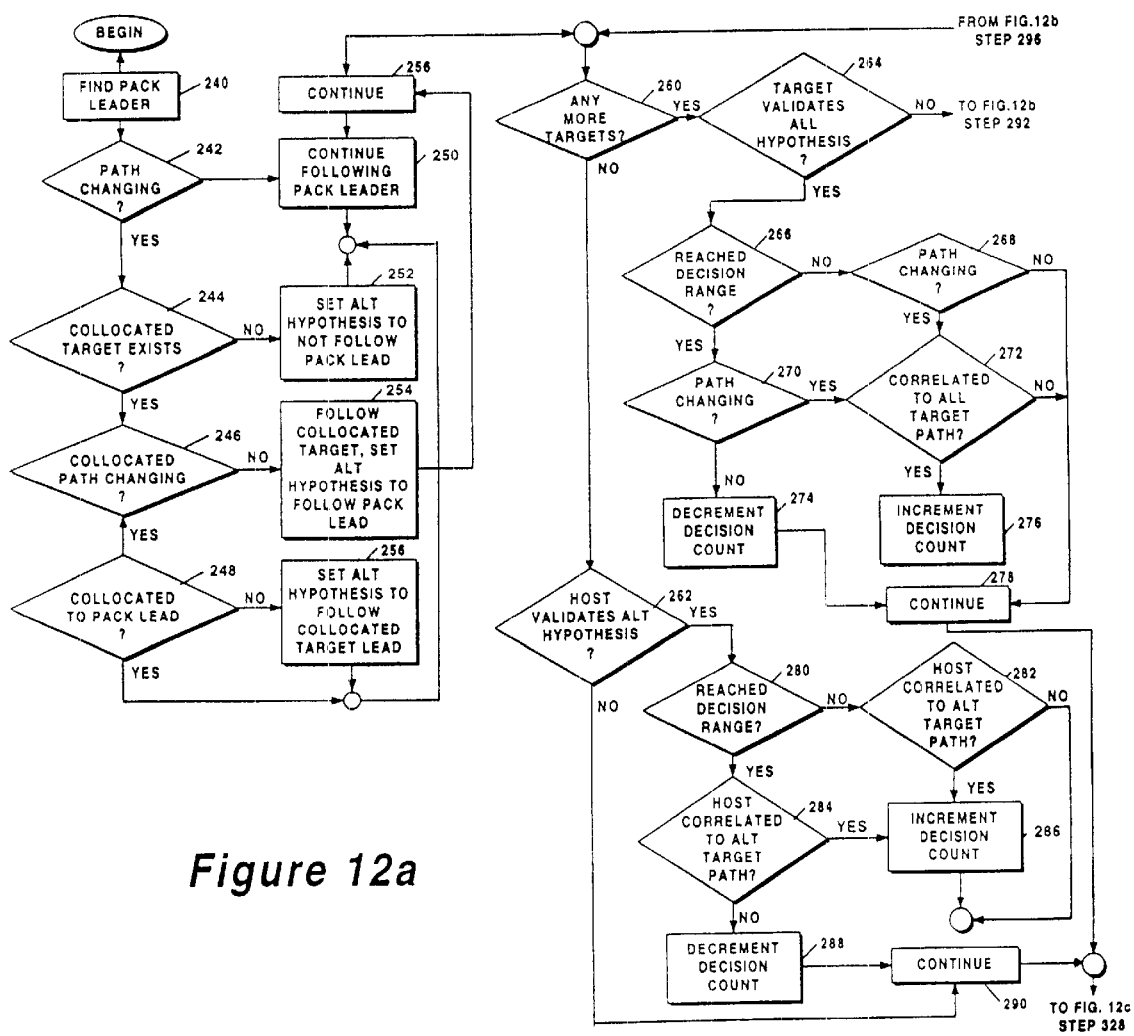
Figure 12B:
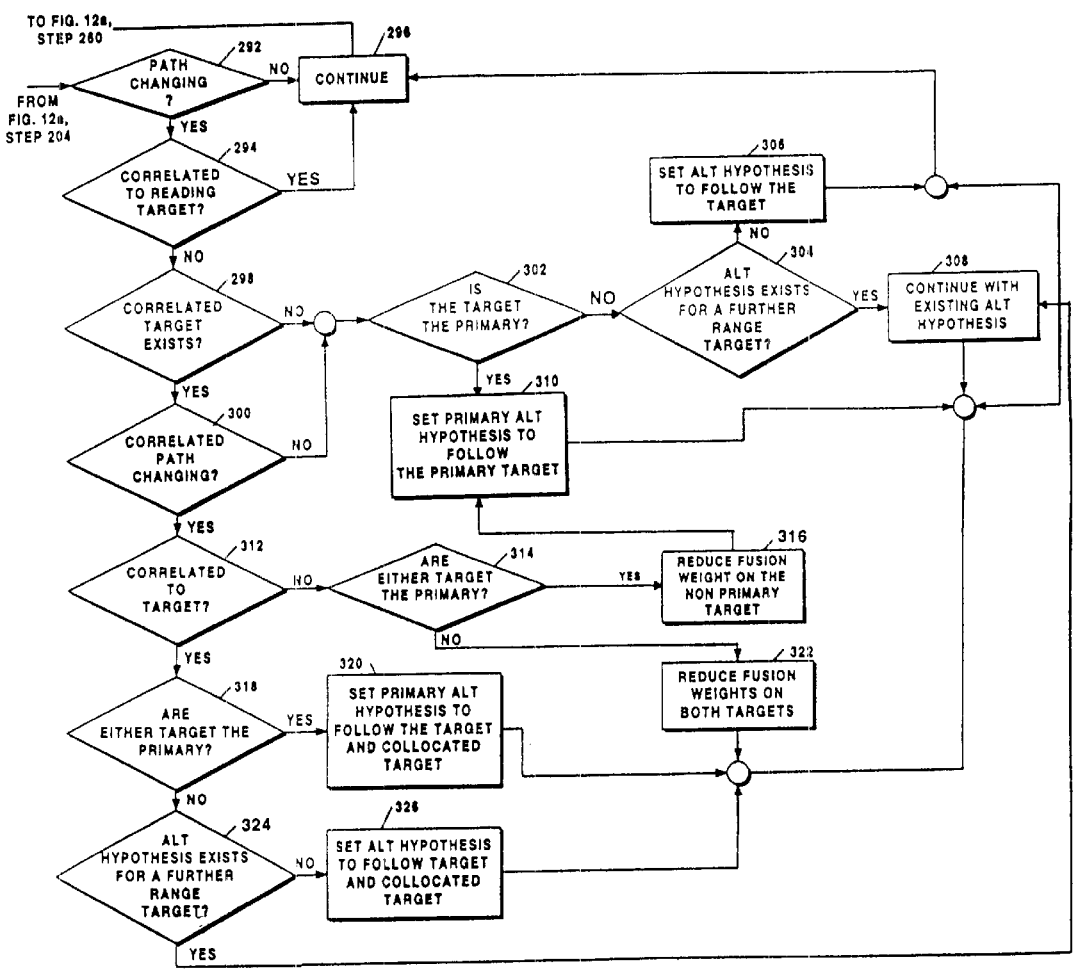
Figure 12C:
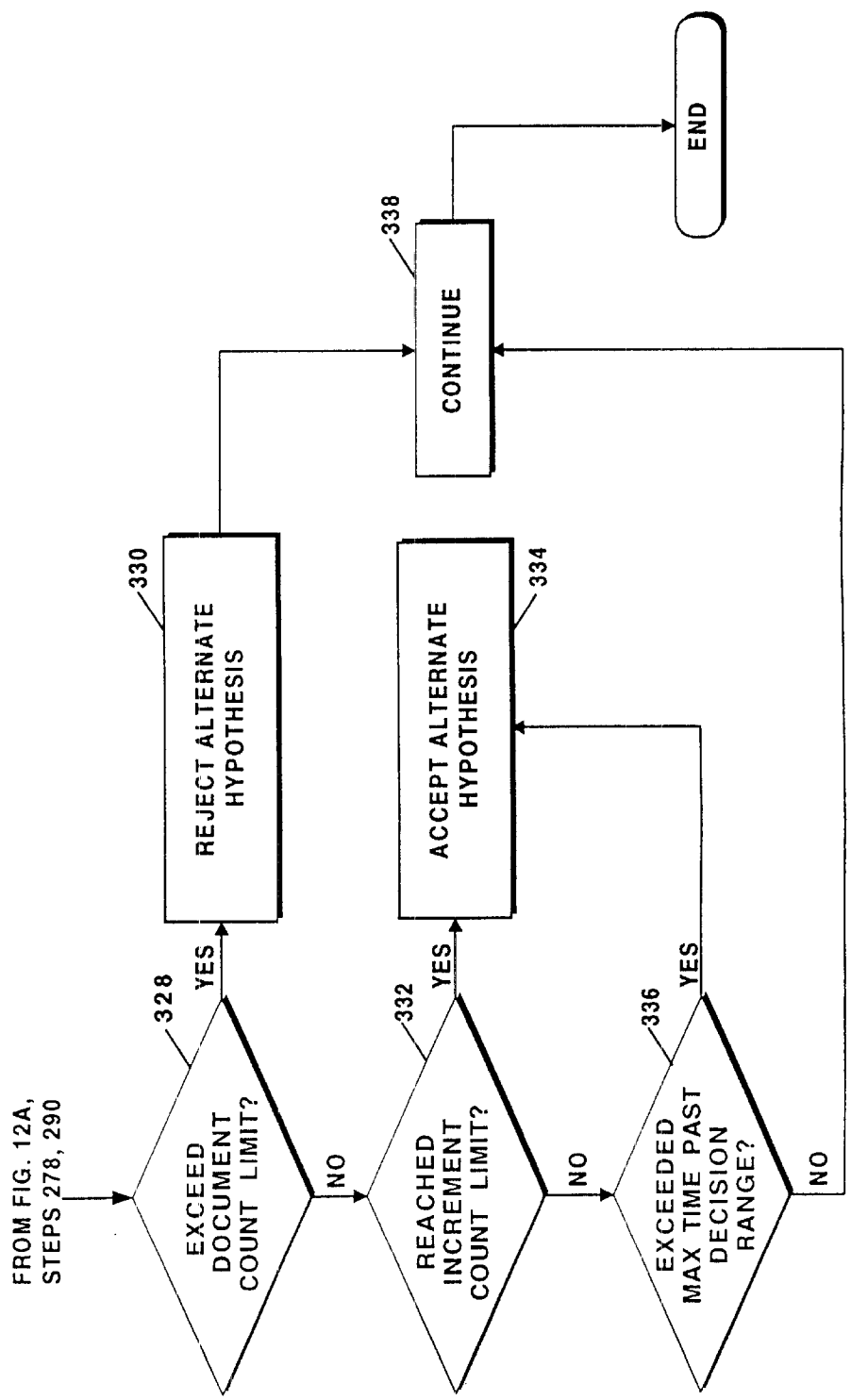

Referring now to FIGS. 12a through 12c, which comprises, in fact, a single flow diagram broken out onto three sheets for readability and which is referred to collectively as FIG. 12, there is shown a detailed flow diagram of the process of step 122 of FIG. 7. This routine is a decision tree for path prediction. Outputs of the correlation analyses are run through a series of decisions that control the fusion weights. Alternate hypotheses are set, maintained, and resolved as well.

The routine begins with process step 240, which identifies the target furthest in range, also called the pack leader. Decision step 242 then queries whether the path of the pack leader is changing. If not, control passes to process step 250. If so, decision step 244 queries whether a co-located target exists. If not, process step 252 sets an alternate hypothesis to not follow the pack leader, and control passes to process step 250.

If decision step 244 determines that a co-located target exists, control passes to decision step 246. Decision step 246 queries whether the path of the co-located target is changing. If not, process step 254 follows the co-located target and sets an alternate hypothesis to follow the pack leader, and control passes to continuation step 258. If decision step 246 determines that the path of the co-located target is changing, control passes to decision step 248, which queries whether the change in the co-located target path is correlated to the path change of the pack leader. If so, control passes to process step 250. If decision step 248 determines that the two paths are not correlated, process step 256 sets an alternate hypothesis to follow the co-located target, and control passes to process step 250.

Process step 250 instructs the routine to continue following the pack leader, and the following step, continuation step 258, passes control to decision step 260.

Decision step 260 queries whether there are any more targets in range. If not, decision step 262 queries whether host vehicle 10 validates the alternate hypothesis. If not, control passes to continuation step 290. If host vehicle 10 does validate the alternate hypothesis, decision step 280 queries whether the decision range has been reached. If so, decision step 284 queries whether host vehicle 10 is correlated to the alternate target path. If not, process step 288 decrements the decision count and control passes to continuation step 290. If decision step 284 determines that host vehicle 10 is correlated to the alternate target path, process step 286 increments the decision count and control passes to continuation step 290.

If decision step 280 determines that the decision range has not been reached, decision step 282 queries whether host vehicle 10 is correlated to the alternate target path. If not, control passes to continuation step 290. If decision step 282 determines that host vehicle 10 is correlated to the alternate target path, process step 286 increments the decision count and control passes to continuation step 290.

If decision step 260 determines that there is at least one more target in range, decision step 264 queries whether the next target validates the alternate hypothesis. If so, decision step 266 queries whether the decision range has been reached. If so, decision step 270 queries whether the target's path is changing. If not, process step 274 decrements the decision count and control passes to continuation step 278. If decision step 270 determines that the target's path is changing, decision step 272 queries whether the target is correlated to the alternate target path. If so, process step 276 increments the decision count and control passes to continuation step 278. If decision step 272 determines that the target is not correlated to the alternate target path, control passes to continuation step 278.

If decision step 266 determines that the decision range has not been reached, decision step 268 queries whether the target's path is changing. If not, control passes to continuation step 278. If decision step 282 determines that the target's path is changing, process step 276 increments the decision count and control passes to continuation step 278.

If decision step 264 determines that the next target does not validate the alternate hypothesis, decision step 292 queries whether the target's path is changing. If not, control passes to continuation step 296. If decision step 292 determines that the target's path is changing, decision step 294 queries whether the target path change is correlated to the path of the leading target. If so, control passes to continuation step 296. If decision step 294 determines that the target's path is not correlated to the path of the leading target, decision step 298 queries whether a co-located target exists. If not, decision step 302 queries whether the target is the primary target, i.e., the target closest to host vehicle 10. If so, process step 310 sets the primary alternate hypothesis to follow the primary target, and control passes to continuation step 296.

If decision step 302 determines that the target is not the primary target, decision step 304 queries whether an alternate hypothesis exists for a further range target. If not, process step 306 sets an alternate hypothesis to follow the target, and control passes to continuation step 296. If decision step 304 determines that an alternate hypothesis exists for a further range target, process step 308 continues with the existing alternate hypothesis, and control passes to continuation step 296.

If decision step 298 determines that a co-located target exists, decision step 300 queries whether the path of the co-located target is changing. If the path of the co-located target is not changing, control passes to decision step 302. If decision step 300 determines that the path of the co-located target is changing, decision step 312 queries whether the path change of the co-located target is correlated to the path change of the target. If the path change of the co-located target is not correlated to the path change of the target, decision step 314 queries whether either the target or the co-located target is the primary target. If a decision is made that either the target or the co-locked target is the primary target, process step 316 reduces the fusion weight on the non-primary target, and control passes to process step 310. If decision step 314 determines that neither the target nor the co-located target is the primary target, process step 322 reduces the fusion weights on both targets, and control passes to continuation step 296.

If decision step 312 determines that the path change of the co-located target is not correlated to the path change of the target, decision step 318 queries whether either the target or the co-located target is the primary target. If a decision is made that either the target or the co-locked target is the primary target, process step 320 sets the primary alternate hypothesis to follow the target and the co-located target, and control passes to continuation step 296. If decision step 318 determines that neither the target nor the co-located target is the primary target, decision step 324 queries whether an alternate hypothesis exists for a further range target. If no alternate hypothesis exists, process step 326 sets an alternate hypothesis to follow the target and the co-located target, and control passes to continuation step 296. If decision step 324 determines that an alternate hypothesis exists for a further range target, control passes to process step 308, which continues with the existing alternate hypothesis, and control then passes to continuation step 296.

Continuation step 296 passes control back to decision step 260. Continuation steps 278 and 290 pass control to decision step 328. Decision step 328 queries whether the decrement count limit has been exceeded. If it has, then the alternate hypothesis is rejected in process step 330 and control passes to continuation step 338. If decision step 328 determines that the decrement count limit has not been exceeded, then decision step 332 queries whether the increment count limit has been reached. If it has, then the alternate hypothesis is accepted in process step 334 and control passes to continuation step 338. If decision step 332 determines that the increment count limit has been not reached, then decision step 336 queries whether the maximum time past decision range has been exceeded. If it has, control passes to process step 334; if not, control passes to continuation step 338. Continuation step 338 passes control back to decision step 124 of FIG. 7.

Figure 13:
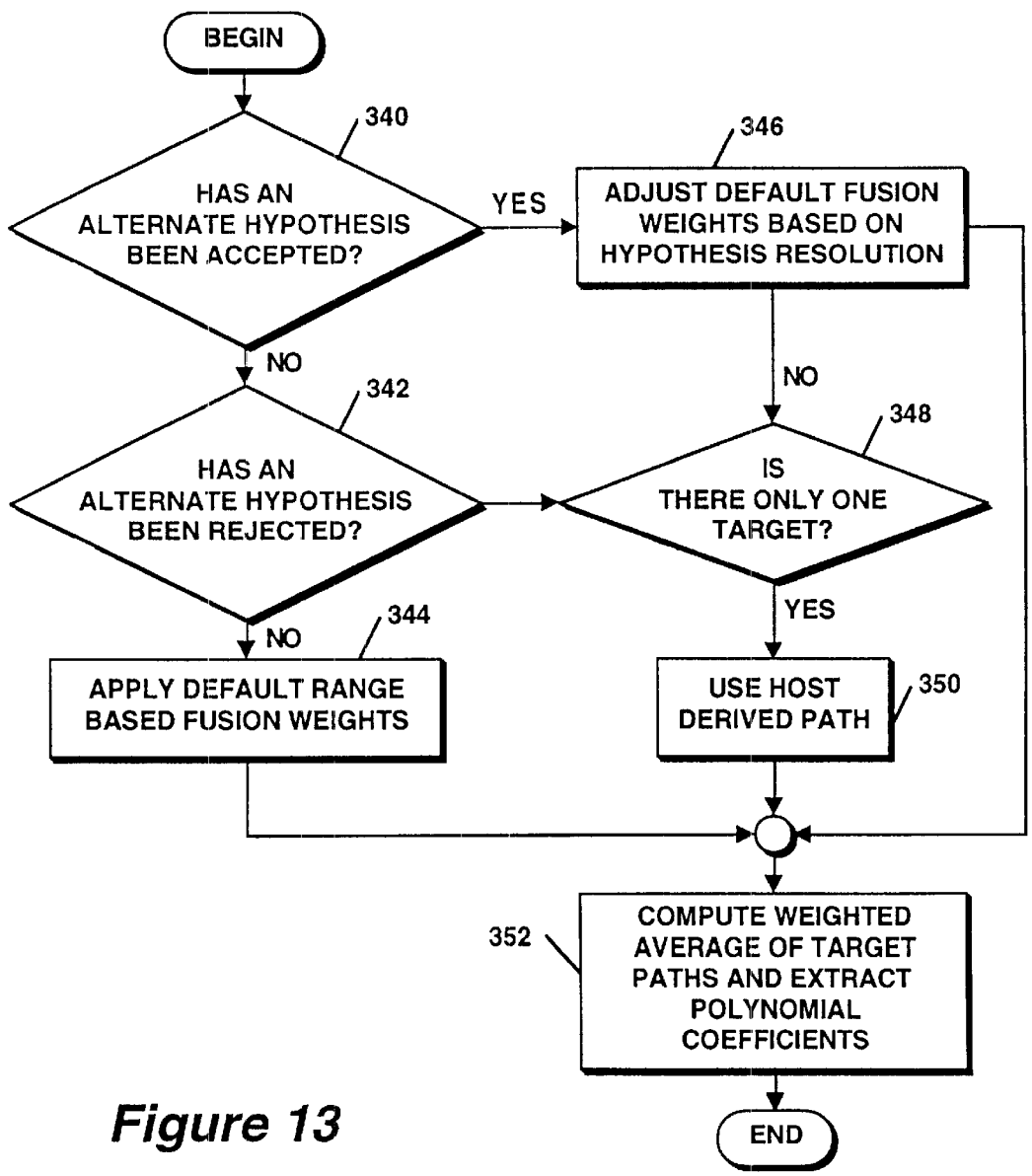

Referring now to FIG. 13, there is shown a detailed flow diagram of the process of step 124 of FIG. 7, in which the target paths are fused with adjusted weights and predicted path data is generated. The fusion is a weighted average of the target paths projected from the polynomial curve fits data. The cross range component is removed from target paths prior to fusion. If there is only one target and it has been rejected upon with hypothesis testing, host path data is used.

The initial step is a decision step 340, which queries whether an alternate hypothesis has been accepted. If an alternate hypothesis has been accepted, control passes to process step 346, which adjusts the fusion weights based on the resolution of the hypothesis. Control then passes to process step 352. Step 352 computes the weighted average of the target paths and extracts the coefficients of the polynomial. Control then passes back to process step 40 of FIG. 3.

If decision step 340 determines that no alternate hypothesis has been accepted, then processing proceeds to decision step 342 which queries whether an alternate hypothesis has been rejected. If an alternate hypothesis has been rejected, decision step 348 queries whether there is only a single target. If there is only a single target, step 350 instructs the process to use the host vehicle derived path, and control again passes to process step 352.

If decision step 348 determines that there is more than one target, control passes to process step 346 and then to step 352.

If decision step 342 determines that no alternate hypothesis has been rejected, step 344 applies default, range-based fusion weights, and control again passes to process step 352.

Figure 14:
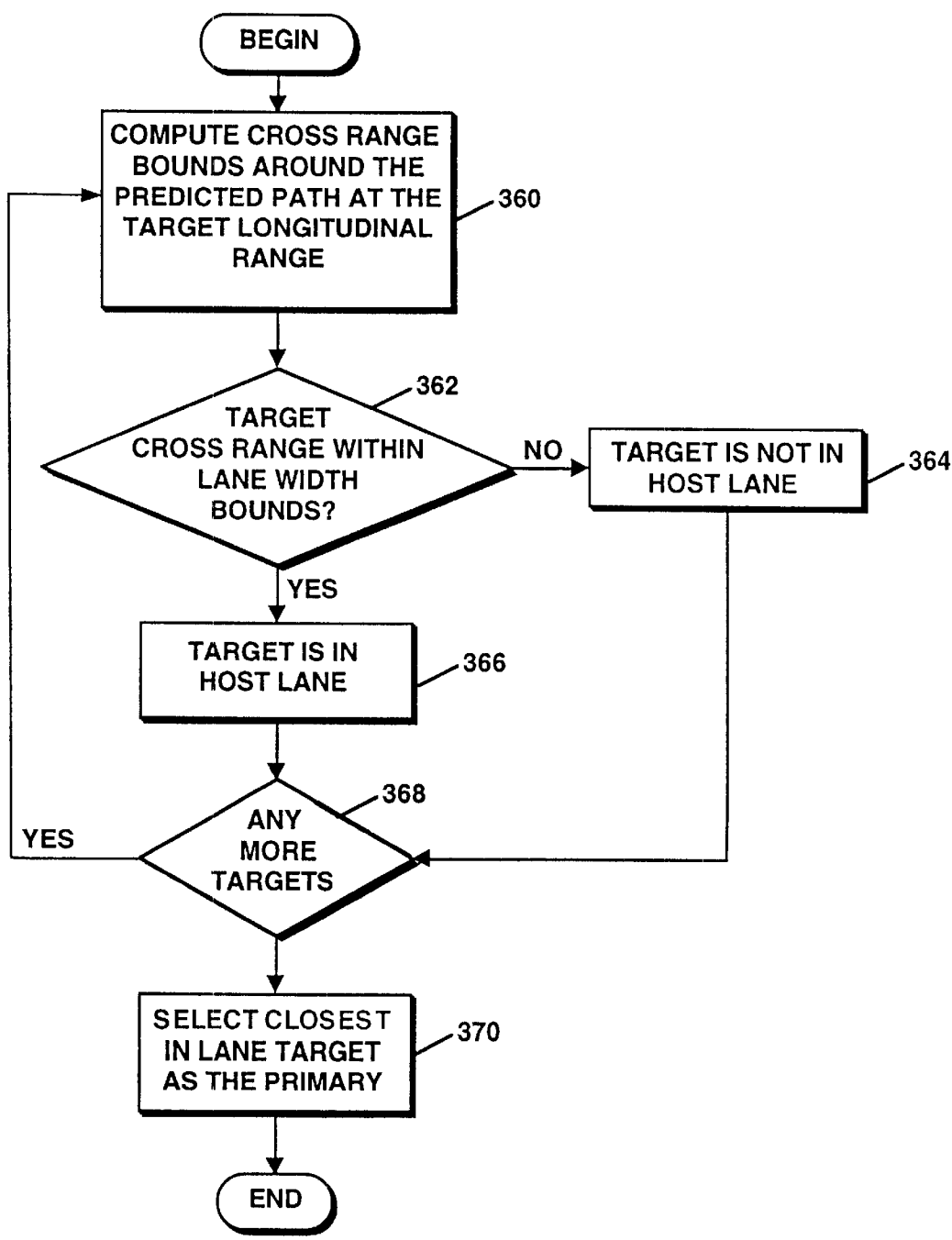

Referring now to FIG. 14, there is shown a detailed flow diagram of the process of step 40 of FIG. 3. In this step, the target cross range positions are compared to the predicted path of host vehicle 10 and the targets are classified as either in-lane or out-of-lane of the host vehicle highway lane. In this example, target positions are compared to within one-half a highway lane width of the predicted path to determine in-lane classification. The closest in-lane target to the host is selected as the primary target. If there are no in-lane targets, then there is no primary target.

At the initial process step 360, for a given target, the cross range bounds of the predicted path of host vehicle 10 at the longitudinal range of that target are computed. Decision step 362 then queries whether the target cross range is within the bounds of the highway lane width. If the target cross range is not within the bounds of the highway lane width, process step 364 identifies the target as not being in the lane of host vehicle 10. If the target cross range is within the bounds of the highway lane width, process step 366 identifies the target as being in the lane of host vehicle 10.

Steps 364 and 366 both pass control to decision step 368 which queries if any more targets are to be checked. If there are more targets to be so identified, control passes back to step 360. If there are no more targets, process step 370 selects the in-lane target at the closest longitudinal distance from host vehicle 10 as being the primary target.

Following process step 370, control returns to the routine of FIG. 3 where, following the next radar update, process step 30 is re-entered.

While the principles of the present invention have been demonstrated with particular regard to the structure and methods disclosed herein, it will be recognized that various departures may be undertaken in the practice of the invention. The scope of the invention is therefore not intended to be limited to the particular structure and methods disclosed herein, but should instead be gauged by the breadth of the claims that follow.

What is claimed is:

1. A system for detecting objects in a predicted path of a vehicle moving on a highway lane, comprising:
   a forward looking sensor for providing range, angle and velocity data for objects within a field of view in front of said vehicle;
   measuring systems for providing velocity and yaw rate data for said vehicle; and
   a processing system responsive to said forward looking sensor and said measuring systems to calculate an estimated path of said vehicle based on its velocity and yaw rate while said vehicle traverses the highway lane, and to calculate estimated paths for each of said objects sensed within the field of view in front of said vehicle, and to determine a lateral distance of each object sensed within the field of view in front of said vehicle from the predicted path of said vehicle while said vehicle traverses the highway lane, and classifying each object sensed within the field of view in front of said vehicle as either in or out of the highway lane of said vehicles, wherein the predicted path of said vehicle is generated by correlating the estimated path of said vehicle and said objects and fusing the paths of said objects as a weighted average.

2. The object detecting system in accordance with claim 1 wherein said forward looking sensor comprises a radar system.

3. The object detecting system in accordance with claim 1 wherein said yaw rate measuring system comprises a gyrocompass.

4. In a system for use in a vehicle, said system including a forward looking sensor for providing range, angle and velocity data for objects within a field of view in front of said vehicle, measuring systems for providing velocity and yaw rate data for said vehicle, and a processing system responsive to said forward looking sensor and said measuring systems, a method for detecting objects in a predicted path of said vehicle while moving on a highway lane, said method comprising the steps of:
   a. calculating an estimated path of said vehicle based on its velocity and yaw rate while said vehicle traverses the highway lane;
   b. calculating estimated paths for each of said objects sensed within the field of view in front of said vehicle;
   c. determining a lateral distance of each object sensed within the field of view in front of said vehicle from the predicted path of said vehicle; and
   d. classifying each object sensed within the field of view in front of said vehicle as either in or out of the highway lane of said vehicle while said vehicle traverses the highway lane, wherein the predicted path of said vehicle is generated by correlating the estimated path of said vehicle and said objects and fusing the paths of said objects as a weighted average.

5. The method in accordance with claim 4 wherein said method is repeated between 10 and 20 times per second.

6. In a system for use in a host vehicle, said system including a forward looking radar system for providing range, angle and velocity data for targets within a field of view in front of said vehicle, measuring systems for providing velocity and yaw rate data for said vehicle, and a processing system responsive to said forward looking radar system and said measuring systems, a method for detecting targets in a predicted path of said host vehicle while moving on a highway lane, said method comprising:
   (a) calculating a host vehicle path estimate from said velocity and yaw rate data for said host vehicle while said host vehicle traverses the highway lane;
   (b) propagating target position histories with said host vehicle path estimate;
   (c) propagating target positions forward with longitudinal and lateral target position state vectors;
   (d) calculating polynomial curve fits for host vehicle and target position state vectors;
   (e) generating said predicted path by correlating said estimated path of said host vehicle and target paths and then fusing the target paths as a weighted average;
   (f) comparing target cross range positions to said predicted path of said host vehicle on the highway lane and classifying targets as in-lane or out-of-lane with respect to the highway lane of said host vehicle;
   (g) receiving updated data from said forward looking radar system; and
   (h) repeating steps a through g continuously.

7. The method in accordance with claim 6 wherein calculating a host vehicle path estimate includes applying a 2-state Kalman filter to track curvature parameters and propagate a host position vector forward in range.

8. The method in accordance with claim 6 wherein propagating target position histories includes calculating a previous position of the target relative to a longitudinal axis of said host vehicle, filling a vector of history points, and dropping one or more points included in the vector of history points as a value of the longitudinal position state vector drops below zero.

9. The method in accordance with claim 6 wherein calculating a the polynomial curve fit for said host vehicle and target position state vectors includes applying a $2^{nd}$ order polynomial curve fit to target history data and host vehicle curvature rate data.

10. The method in accordance with claim 9 wherein said polynomial curve has a form $$x = c_0 + c_1 \cdot y + c_2 \cdot y^2,$$

where x is a lateral direction and y is a longitudinal direction, and where $c_0$, $c_1$, and $C_2$ are the $0^{th}$, $1^{st}$, and $2^{nd}$ order polynomial coefficients, respectively, that specify a shape of the curve in a cross range dimension.

11. The method in accordance with claim 6 wherein calculating a polynomial curve fit for said target position state vectors includes propagating data forward from target position and velocity estimates in the longitudinal and lateral dimensions.

12. The method in accordance with claim 11 wherein said polynomial curve has the a form $$x = c_0 + c_1 \cdot y + c_2 \cdot y^2,$$

where x is the lateral direction and y is the longitudinal direction, and where $c_0$, $c_1$, and $C_2$ are the $0^{th}$, $1^{st}$, and $2^{nd}$ order polynomial coefficients, respectively, that specify a shape of the curve in a cross range dimension.

13. The method in accordance with claim 12 wherein generating said predicted path by correlating host vehicle and target paths and then fusing the target paths as a weighted average further comprises:

adjusting fusion weights depending on the resolution of an accepted alternate path hypothesis, or using the host vehicle derived path if an alternate path hypothesis has been rejected and there is only a single target, or adjusting fusion weights depending on the resolution of an rejected alternate path hypothesis where there is more than one target, or applying default, range-based fusion weights where no alternate path hypothesis has been rejected;

computing the weighted average of the target paths; and extracting the coefficients of said polynomial.

14. The method in accordance with claim 6 wherein generating said predicted path includes testing for a highway lane change by said host vehicle.

15. The method in accordance with claim 14 wherein generating said predicted path includes comparing the unfiltered yaw rate measurement of said host vehicle to a previously updated path heading coefficient multiplied by twice the velocity of said host vehicle.

16. The method in accordance with claim 15 wherein a highway lane change by said host vehicle is confirmed by:

comparing the integrated yaw rate to each target heading coefficient to see if it is equal and opposite;

confirming that the majority of targets are moving in the opposite direction of said host vehicle; and noting that said opposite direction motion has occurred at two consecutive data updates from said forward looking radar system.

17. The method in accordance with claim 6 wherein generating said predicted path includes calculating default target fusion weights.

18. The method in accordance with claim 17 wherein said default target fusion weights are assigned a value of one for the range between said host vehicle and the present position of said target, and monotonically decreasing values beyond said target to the end of the range of said forward looking radar system.

19. The method in accordance with claim 6 wherein comparing target cross range positions to said predicted path includes comparing the target positions to within one-half highway lane width of the predicted path to determine in-lane classification.

20. The method in accordance with claim 6 wherein generating said predicted path by correlating host vehicle and target paths and then fusing the target paths as a weighted average further comprises the process of setting an alternate path hypothesis when the target furthest in range deviates from the predicted path, said alternate path hypothesis continuing to follow the predicted path.

* * * * *

UNITED STATES PATENT AND TRADEMARK OFFICE
CERTIFICATE OF CORRECTION

PATENT NO. : 6,675,094 B2
DATED : January 6, 2004
INVENTOR(S) : Mark E. Russell et al.

It is certified that error appears in the above-identified patent and that said Letters Patent is hereby corrected as shown below:

Column 1,
Line 56, delete "reliability" and replace with -- reliably --.

Column 10,
Line 2, delete "10 per second" and replace with -- 10 meters per second --.
Line 19, delete "co." and replace with -- $C_0$. --.

Column 14,
Line 5, delete "has been not reached," and replace with -- has not been reached --.

Column 15,
Line 32, delete "vehicles, wherein" and replace with -- vehicle, wherein --.

Column 16,
Lines 52 and 65, delete "$C_2$" and replace with -- $c_2$ --.

Column 17,
Line 11, delete "an rejected" and replace with -- a rejected --.

Signed and Sealed this

First Day of June, 2004

JON W. DUDAS
*Acting Director of the United States Patent and Trademark Office*